United States Patent
Johnson et al.

(10) Patent No.: US 10,024,217 B1
(45) Date of Patent: Jul. 17, 2018

(54) REDUCTANT DECOMPOSITION REACTOR CHAMBER

(71) Applicant: CUMMINS EMISSION SOLUTIONS INC., Columbus, IN (US)

(72) Inventors: Ryan M. Johnson, Cottage Grove, WI (US); Udit Bhaveshkumar Shah, Gandhinager (IN); Samuel Johnson, Bloomington, IN (US); Mahendra Mittapalli, Mancherial (IN); Kartiki Jagtap, Phaltan (IN)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

(21) Appl. No.: 15/683,315

(22) Filed: Aug. 22, 2017

(51) Int. Cl.
| | | |
|---|---|---|
| *F01N 3/10* | (2006.01) | |
| *F01N 3/28* | (2006.01) | |
| *F01N 3/20* | (2006.01) | |
| *B01D 53/94* | (2006.01) | |

(52) U.S. Cl.
CPC ......... *F01N 3/2892* (2013.01); *B01D 53/944* (2013.01); *B01D 53/9418* (2013.01); *B01D 53/9477* (2013.01); *F01N 3/2066* (2013.01)

(58) Field of Classification Search
CPC .. F01N 3/2066; F01N 3/2892; F01N 13/1805; F01N 2610/02; F01N 3/035; F01N 2470/00
USPC ........................................................ 422/176
See application file for complete search history.

(56) References Cited

U.S. PATENT DOCUMENTS

| | | | | |
|---|---|---|---|---|
| 6,722,124 B2 * | 4/2004 | Pawson | ............... | B01D 53/9431 60/286 |
| 8,893,481 B2 * | 11/2014 | Katou | ....................... | F01N 3/10 60/295 |
| 2009/0313979 A1 * | 12/2009 | Kowada | ............. | B01D 53/9431 60/297 |
| 2010/0146950 A1 * | 6/2010 | Hayashi | ............. | B01D 53/9431 60/301 |
| 2010/0186382 A1 * | 7/2010 | Schroeder | ............... | F01N 3/025 60/286 |
| 2010/0223916 A1 * | 9/2010 | Hayashi | ................. | F01N 3/2066 60/295 |

(Continued)

FOREIGN PATENT DOCUMENTS

| | | |
|---|---|---|
| FR | 2 977 912 | 1/2013 |
| FR | 2 972 764 | 3/2013 |
| FR | 2 974 595 | 5/2015 |

*Primary Examiner* — Tom P Duong
(74) *Attorney, Agent, or Firm* — Foley & Lardner LLP

(57) ABSTRACT

A decomposition reactor for an exhaust system includes an exterior component defining an internal volume and having an inlet and an outlet with the inlet and outlet are formed on a same side of the exterior component. A flow divider is positioned within the internal volume and defines a thermal management chamber and a main flow chamber. A first flow path of exhaust flows from the inlet into the main flow chamber to mix with dosed, and a second flow path of exhaust flows from the inlet into the thermal management chamber to control a temperature of a portion of the flow divider. In some implementations, one or more swirling diverters can be coupled to the flow divider and positioned proximate the outlet of the exterior component to impart a vortical motion to a combined reductant and exhaust gas flow exiting out the outlet.

25 Claims, 21 Drawing Sheets

(56) References Cited

U.S. PATENT DOCUMENTS

2014/0311137 A1 10/2014 Wikaryasz et al.
2015/0308316 A1 10/2015 Li et al.

* cited by examiner

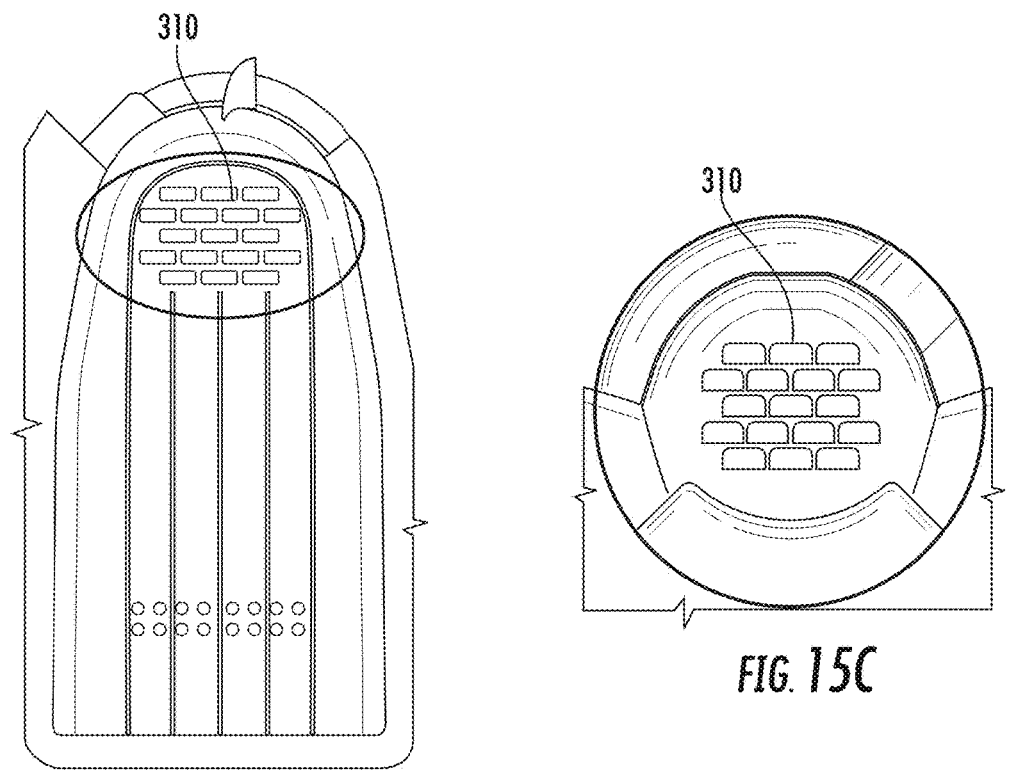
FIG. 15B
FIG. 15C
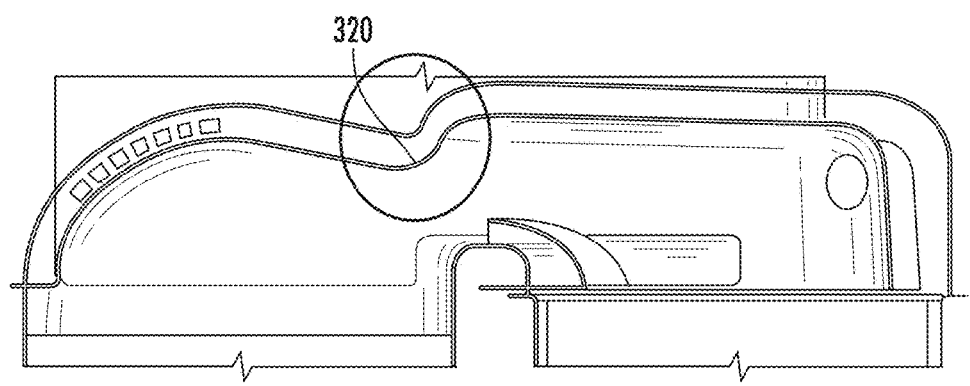
FIG. 16

REDUCTANT DECOMPOSITION REACTOR CHAMBER

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia or urea, is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system upstream of the catalyst chamber. The SCR system may include one or more sensors to monitor conditions within the exhaust system.

SUMMARY

Implementations described herein relate to decomposition reactors, such as U-shape or V-shaped decomposition reactors having an inlet and outlet on a same side.

One implementation relates to a decomposition reactor for an exhaust system that includes an exterior component and a flow divider. The exterior component defines an internal volume and has an inlet and an outlet. The inlet and outlet are formed on a same side of the exterior component. The flow divider is positioned within the internal volume defined by the exterior component and is coupled to the exterior component. The flow divider defines a thermal management chamber and a main flow chamber within the internal volume. The main flow chamber is in fluid communication with the inlet and the outlet, and the thermal management chamber is in fluid communication with the inlet and a downstream portion of the main flow chamber proximate the outlet. The flow divider includes an opening through which reductant from a doser is dosed into the main flow chamber. A first flow path of exhaust flows from the inlet into the main flow chamber to mix with reductant dosed through the opening in the flow divider and out the outlet. A second flow path of exhaust flows from the inlet into the thermal management chamber to control a temperature of a portion of the flow divider and out through one or more openings formed in the flow divider into the main flow chamber.

In some implementations, the decomposition reactor includes a mixer positioned within the main flow chamber. In some implementations, the decomposition reactor includes one or more flow guide baffles positioned in the thermal management chamber between the flow divider and the exterior component. The one or more flow guide baffles may extend at least 50% of a length of an outer wall of the exterior component. The one or more flow guide baffles may be evenly spaced within the thermal management chamber to provide substantially uniform amounts of exhaust gas mass flow. The one or more flow guide baffles may be configured to concentrate exhaust gas flow at a region of the flow divider. Concentrating exhaust gas flow at the region of the flow divider may include reducing a cross-sectional area for exhaust gas flowing through a portion of the thermal management chamber proximate the region. The one or more flow guide baffles may be flat plates. In some implementations, the one or more openings comprise perforated cones. In some implementations, the decomposition reactor may further include one or more slats spanning across at least a portion of the inlet and configured to redirect exhaust gas flow from a first direction from the inlet to a second, different direction.

Another implementation relates to a decomposition reactor for an exhaust system that includes an exterior component, a flow divider, and one or more swirling diverters. The exterior component defines an internal volume and has an inlet and an outlet. The inlet and outlet are formed on a same side of the exterior component. The flow divider is positioned within the internal volume defined by the exterior component and is coupled to the exterior component. The flow divider defines a thermal management chamber and a main flow chamber within the internal volume. The main flow chamber is in fluid communication with the inlet and the outlet, and the thermal management chamber is in fluid communication with the inlet and a downstream portion of the main flow chamber proximate the outlet. The flow divider includes an opening through which reductant from a doser is dosed into the main flow chamber. The one or more swirling diverters are coupled to the flow divider and positioned proximate the outlet of the exterior component. A first flow path of exhaust flows from the inlet into the main flow chamber to mix with reductant dosed through the opening in the flow divider and out the outlet. A second flow path of exhaust flows from the inlet into the thermal management chamber to control a temperature of a portion of the flow divider and out through one or more openings formed in the flow divider into the main flow chamber.

In some implementations, the decomposition reactor includes a mixer positioned within the main flow chamber. In some implementations, the decomposition reactor includes one or more flow guide baffles positioned in the thermal management chamber between the flow divider and the exterior component. The one or more flow guide baffles may extend at least 50% of a length of an outer wall of the exterior component. The one or more flow guide baffles may be evenly spaced within the thermal management chamber to provide substantially uniform amounts of exhaust gas mass flow. The one or more flow guide baffles may be configured to concentrate exhaust gas flow at a region of the flow divider. Concentrating exhaust gas flow at the region of the flow divider may include reducing a cross-sectional area for exhaust gas flowing through a portion of the thermal management chamber proximate the region. The one or more flow guide baffles may be flat plates. In some implementations, the main flow chamber includes a partition dividing the main flow chamber into a first chamber and a second chamber where the first chamber receives the first flow path of exhaust and the second chamber receives a third flow path of exhaust. The first flow path of exhaust from the first chamber and the third flow path of exhaust from the second chamber can combine in the downstream portion of the main flow chamber and upstream of the one or more swirling diverters.

Yet a further implementation relates to a decomposition reactor for an exhaust system that includes an exterior component, a flow divider, a mixer, and one or more flow guide baffles. The exterior component defines an internal volume and has an inlet and an outlet. The inlet and outlet are formed on a same side of the exterior component. The flow divider is positioned within the internal volume defined by the exterior component and is coupled to the exterior component. The flow divider defines a thermal management chamber and a main flow chamber within the internal volume. The main flow chamber is in fluid communication with the inlet and the outlet, and the thermal management chamber is in fluid communication with the inlet and a downstream portion of the main flow chamber proximate the outlet. The flow divider includes an opening through which reductant from a doser is dosed into the main flow chamber. The mixer is positioned within the main flow chamber. The one or more flow guide baffles are positioned in the thermal management chamber between the flow divider and the exterior component. A first flow path of exhaust flows from the inlet into the main flow chamber to mix with reductant dosed through the opening in the flow divider and out the outlet. A second flow path of exhaust flows from the inlet into the thermal management chamber to control a temperature of a portion of the flow divider and out through one or more openings formed in the flow divider into the main flow chamber.

In some implementations, the one or more flow guide baffles may extend at least 50% of a length of an outer wall of the exterior component. The one or more flow guide baffles may be evenly spaced within the thermal management chamber to provide substantially uniform amounts of exhaust gas mass flow. The one or more flow guide baffles may be configured to concentrate exhaust gas flow at a region of the flow divider. In some implementations, the decomposition reactor includes one or more swirling diverters coupled to the flow divider and positioned proximate the outlet of the exterior component. The one or more swirling diverters impart a vortical motion to a combined reductant and exhaust gas flow exiting out the outlet.

BRIEF DESCRIPTION

The details of one or more implementations are set forth in the accompanying drawings and the description below. Other features, aspects, and advantages of the disclosure will become apparent from the description, the drawings, and the claims, in which:

Figure 2:
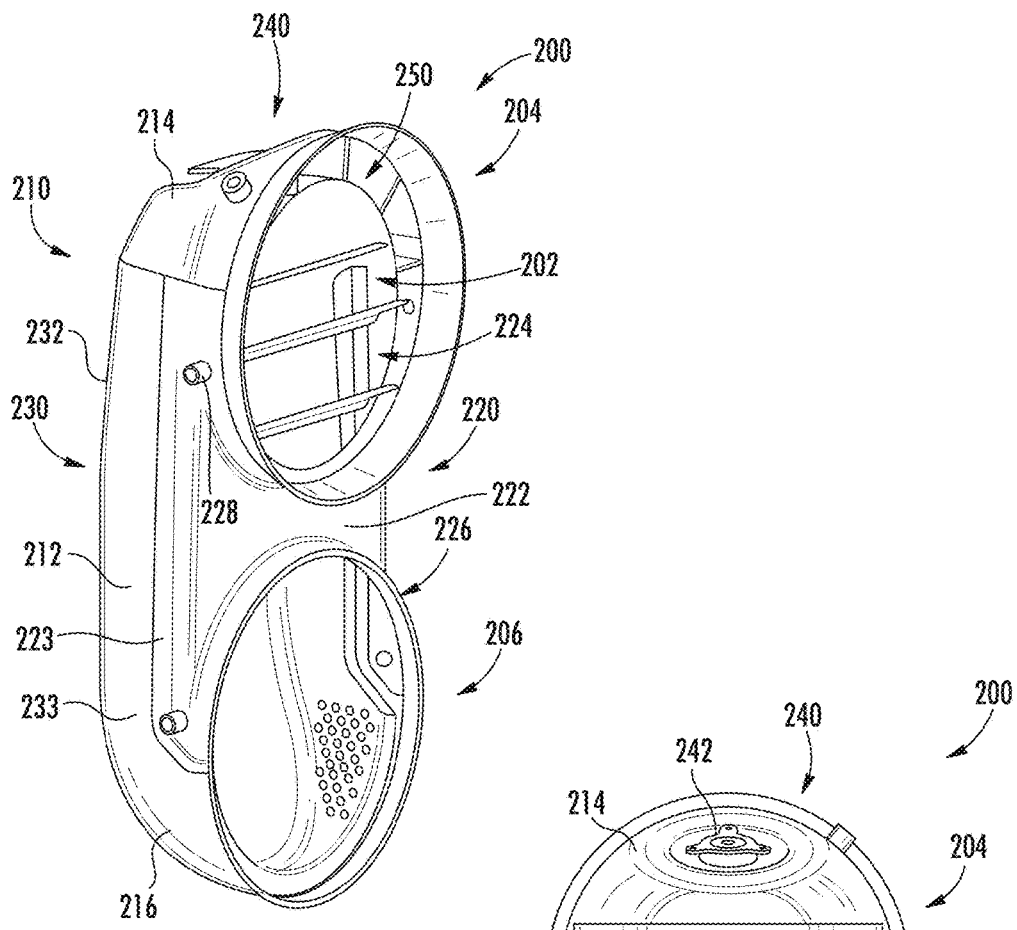
FIG. 2 is a perspective view of an implementation of a reductant decomposition reactor.
Figure 3:
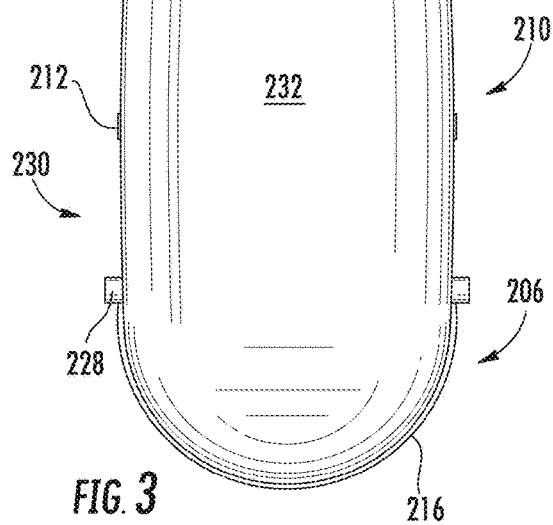
FIG. 3 is a left side view of the reductant decomposition reactor of FIG. 2.
Figure 4:
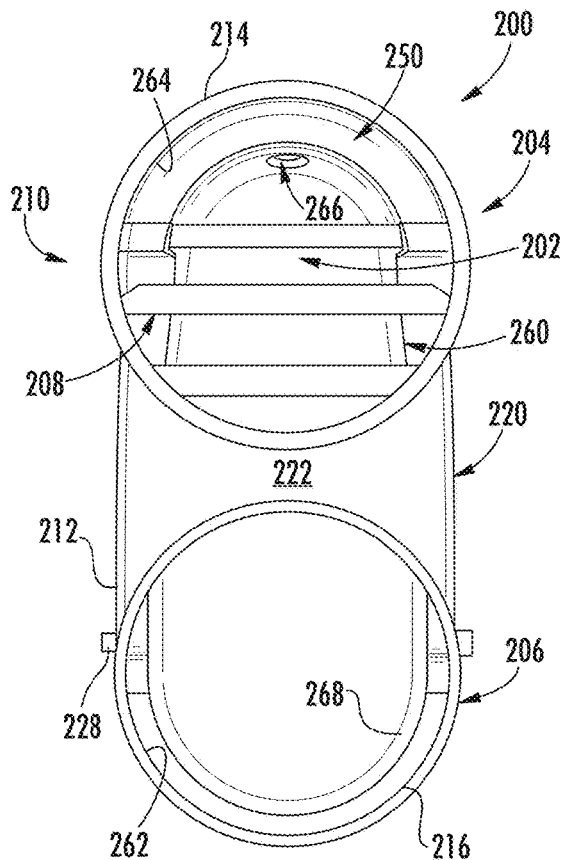
FIG. 4 is a right side view of the reductant decomposition reactor of FIG. 2.
Figure 6:
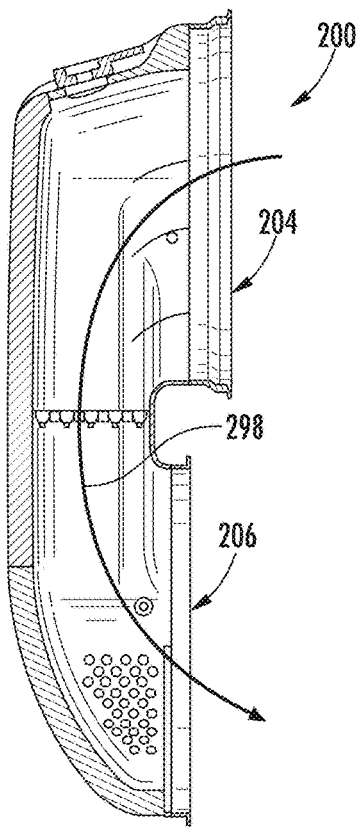
FIG. 6 is a cross-sectional view of the reductant decomposition reactor of FIG. 2 showing a flow path of exhaust gas.
Figure 5:
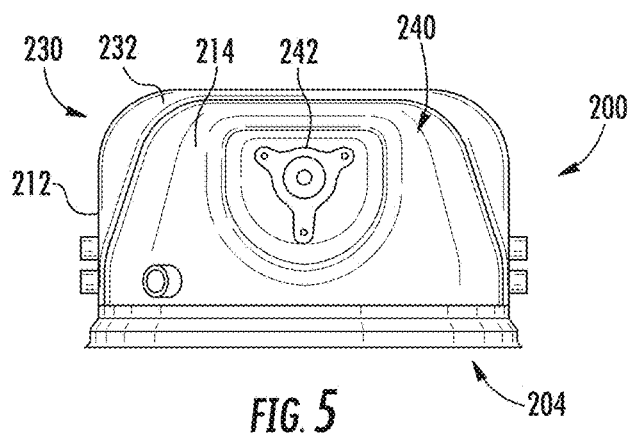
FIG. 5 is a top view of the reductant decomposition reactor of FIG. 2.
Figure 7:
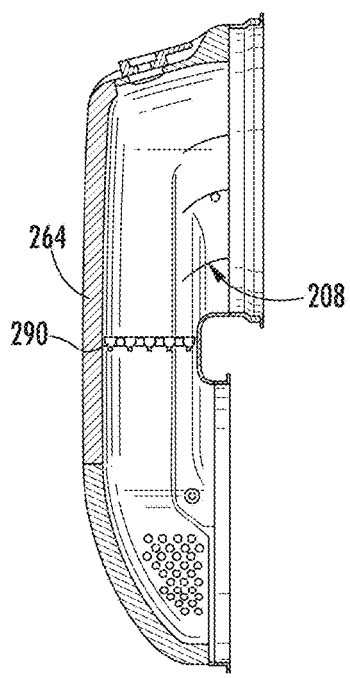
FIG. 7 is a cross-sectional view of the reductant decomposition reactor of FIG. 2.
Figure 8:
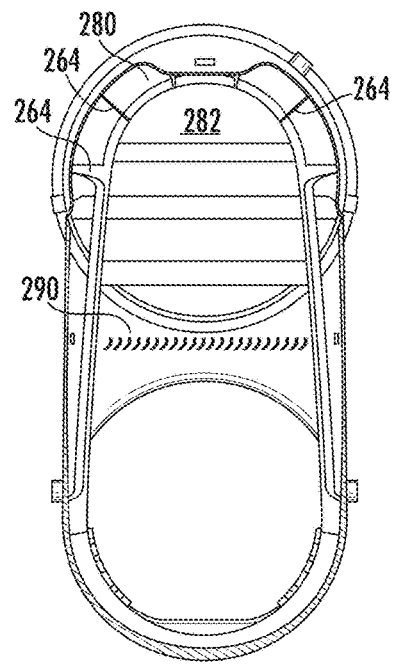
FIG. 8 is a cross-sectional view of the reductant decomposition reactor of FIG. 2 showing lower components thereof.
Figure 9:
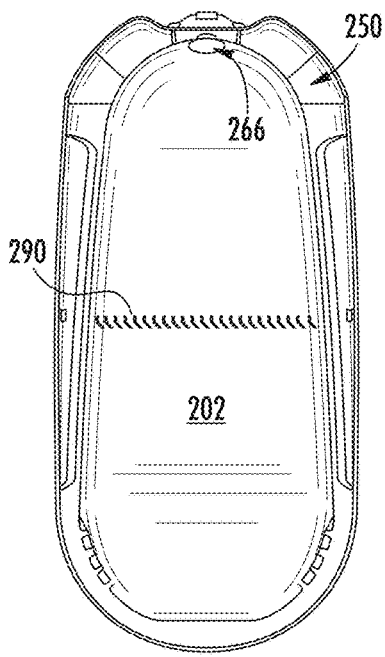
FIG. 9 is a cross-sectional view of the reductant decomposition reactor of FIG. 2 showing upper components thereof.
Figure 10:
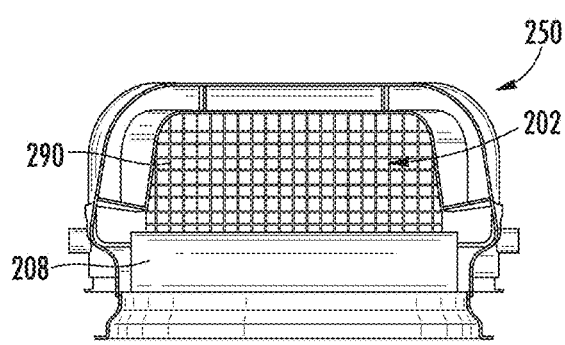
FIG. 10 is a top cross-sectional view of the reductant decomposition reactor of FIG. 2.
Figure 11A:
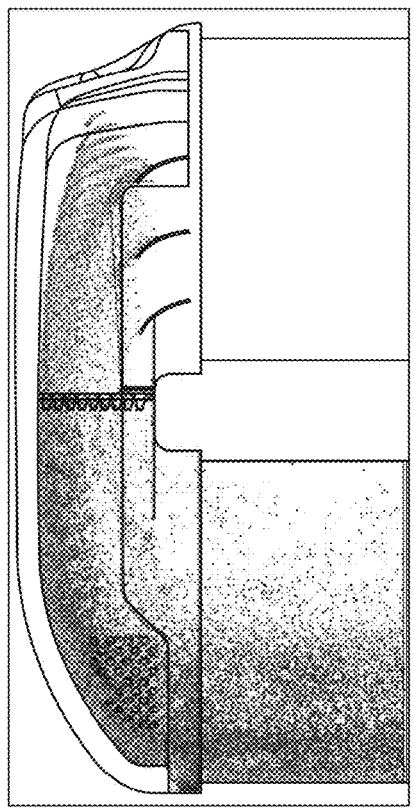
Figure 11B:
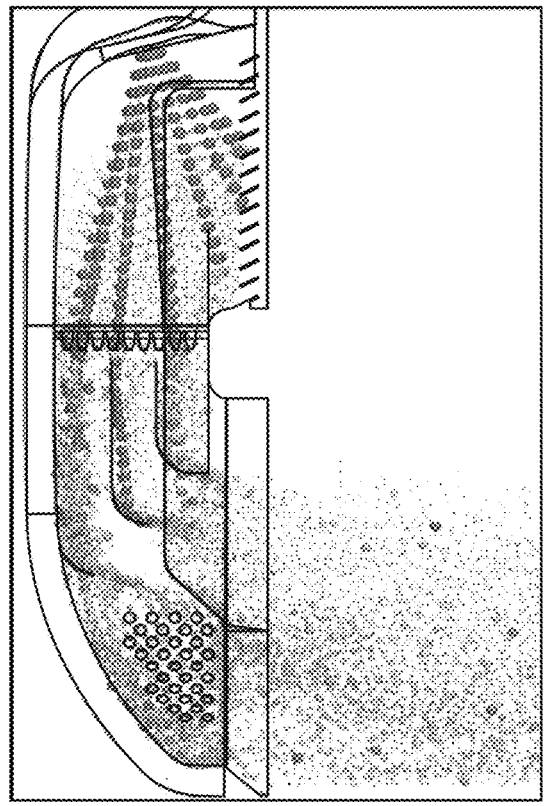
Figure 12:
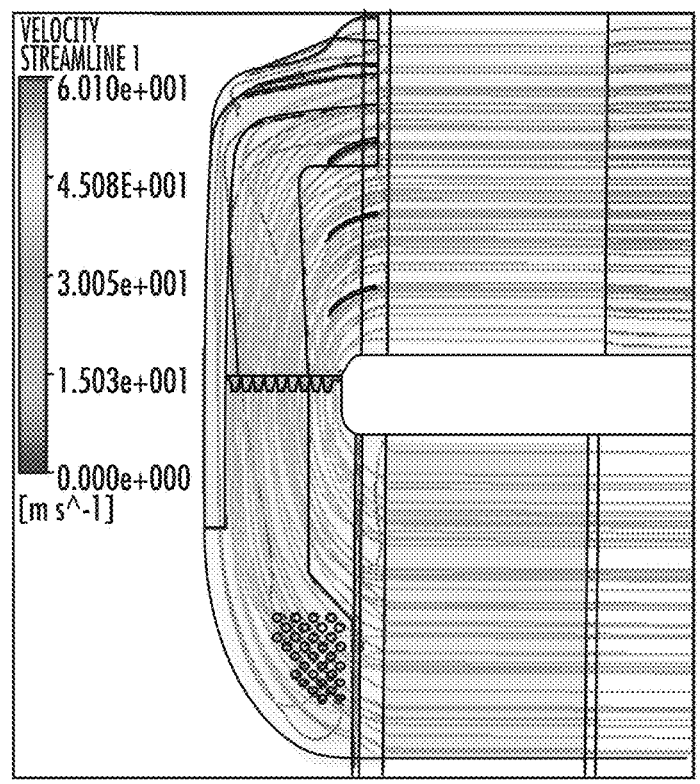
Figure 13:
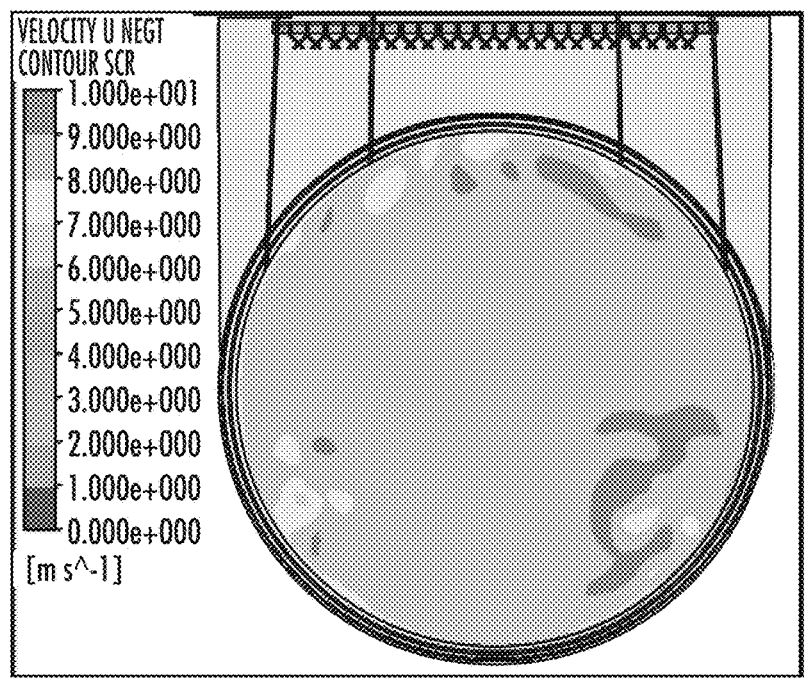
Figure 14A:
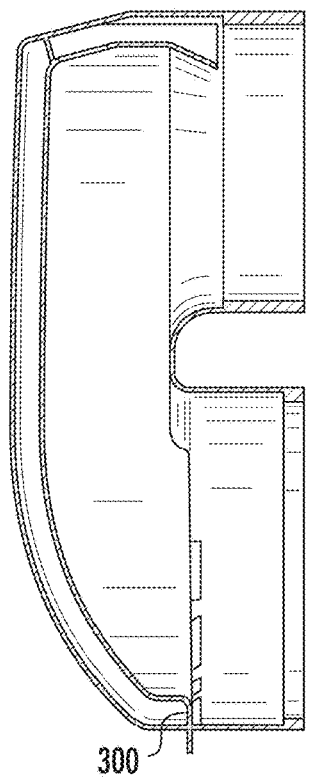
Figure 14B:
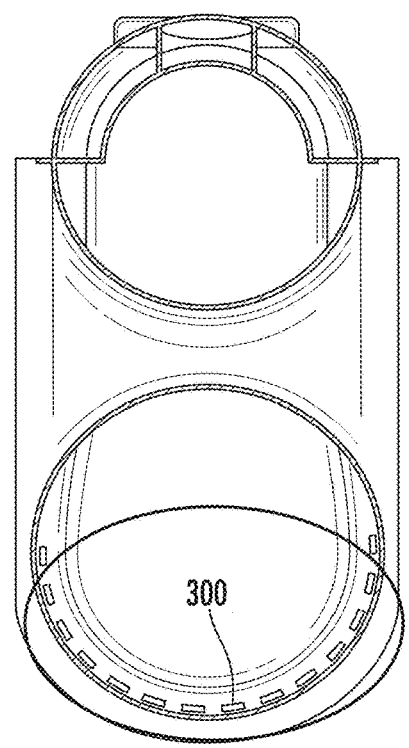
Figure 15A:
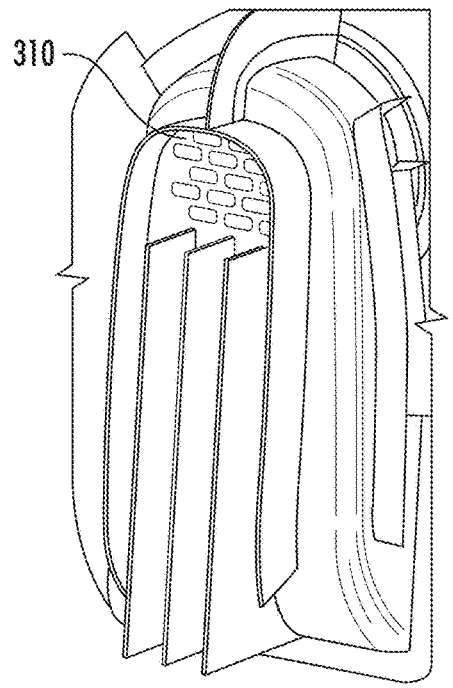
Figure 17A:
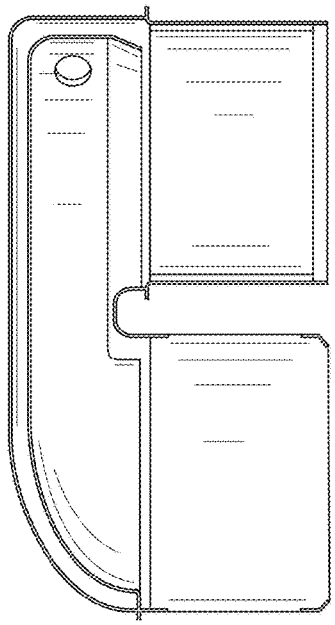
Figure 17B:
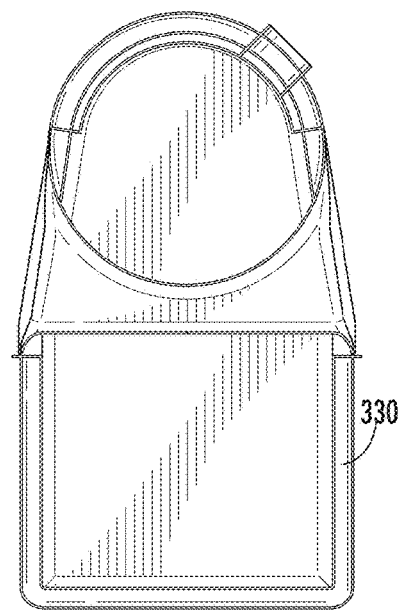
Figure 18A:
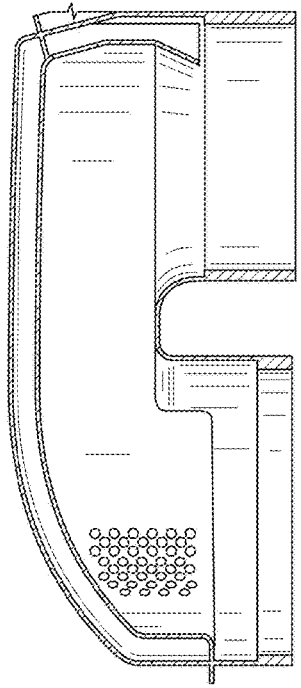
Figure 18B:
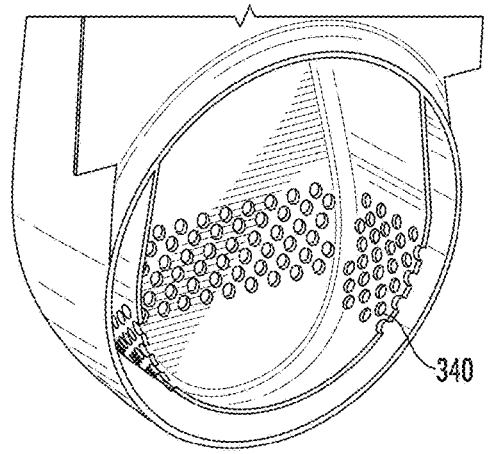
Figure 19A:
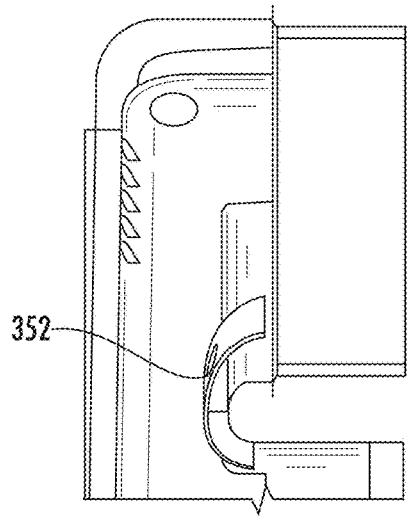
Figure 19B:
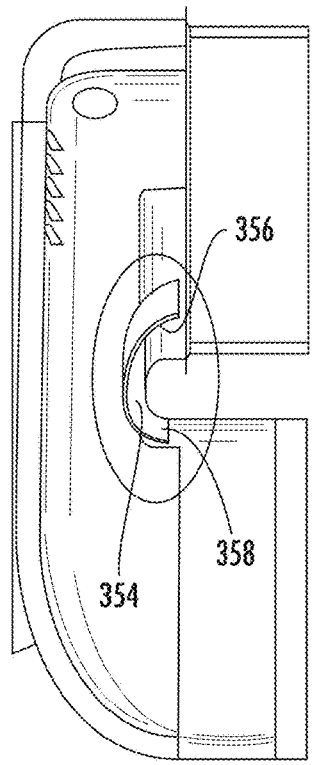
Figure 19C:
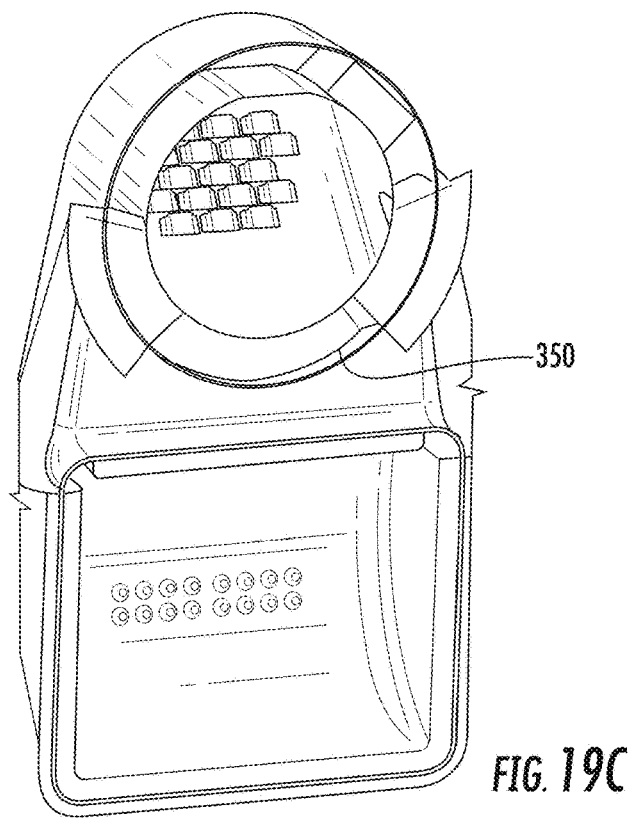
Figure 20A:
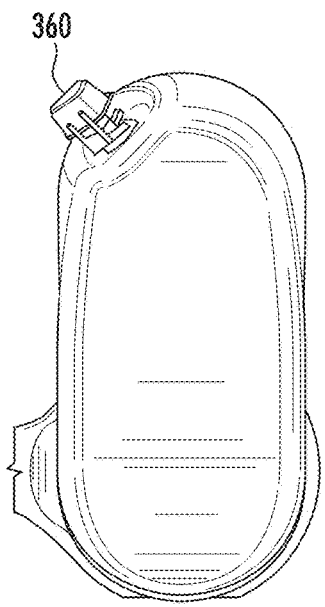
Figure 20B:
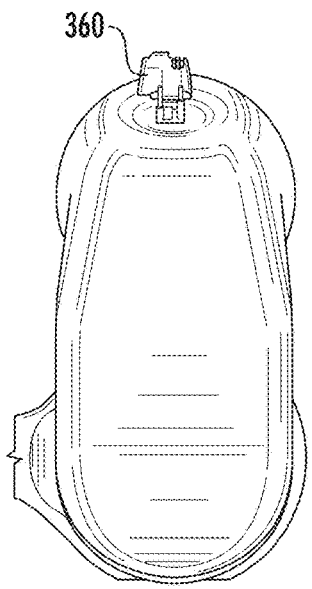
Figure 21:
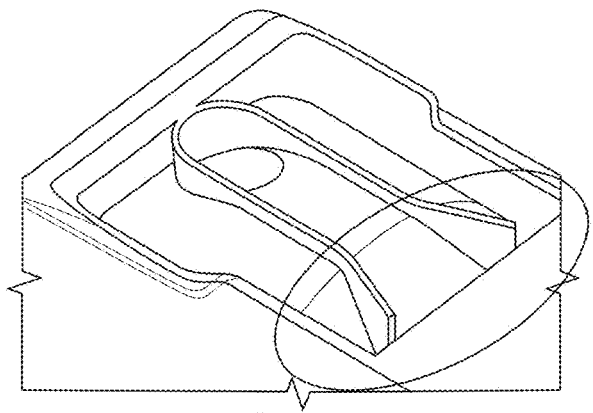
Figure 22:
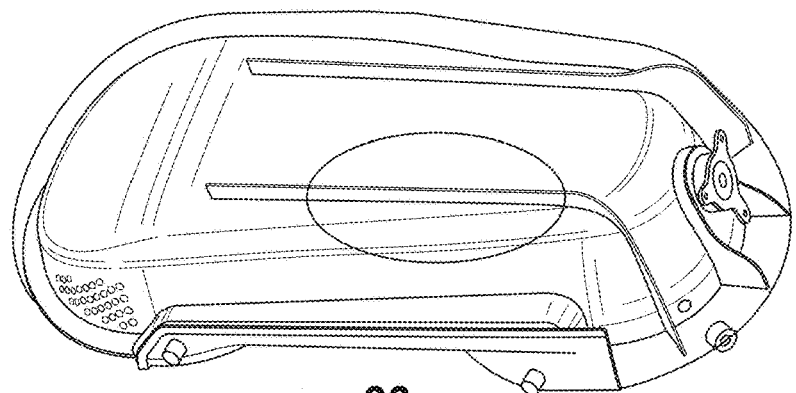
Figure 23:
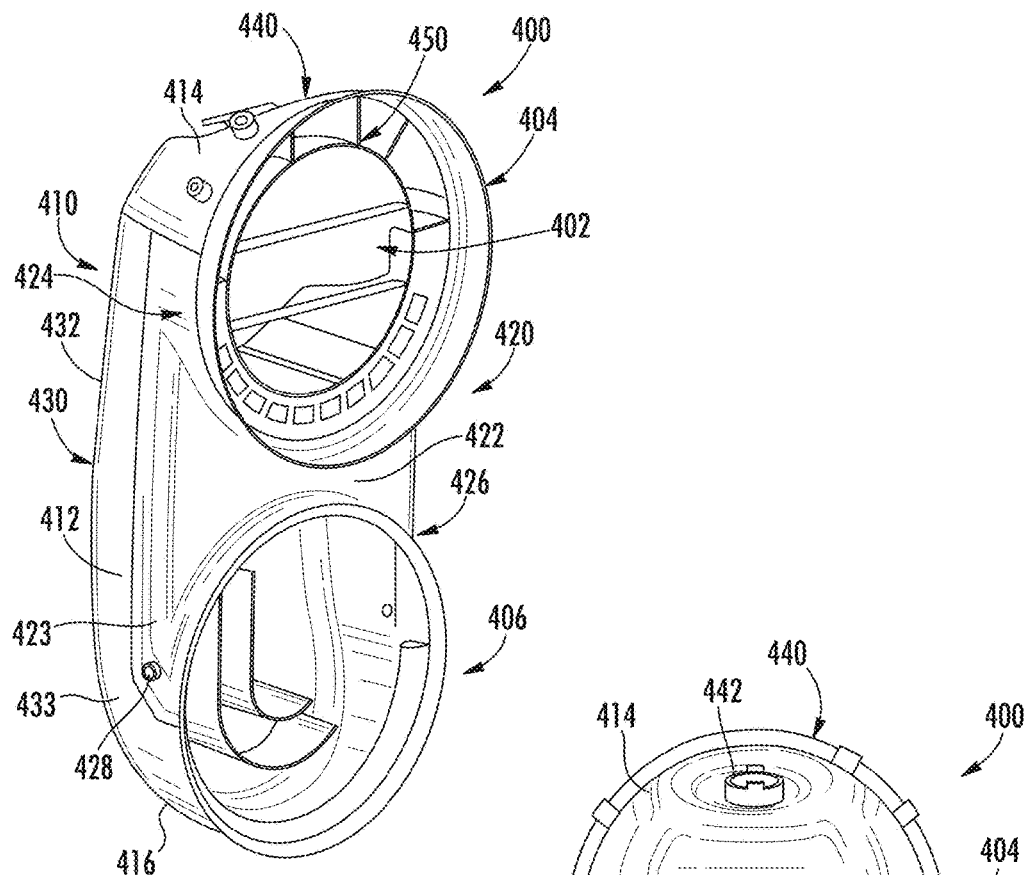
Figure 24:
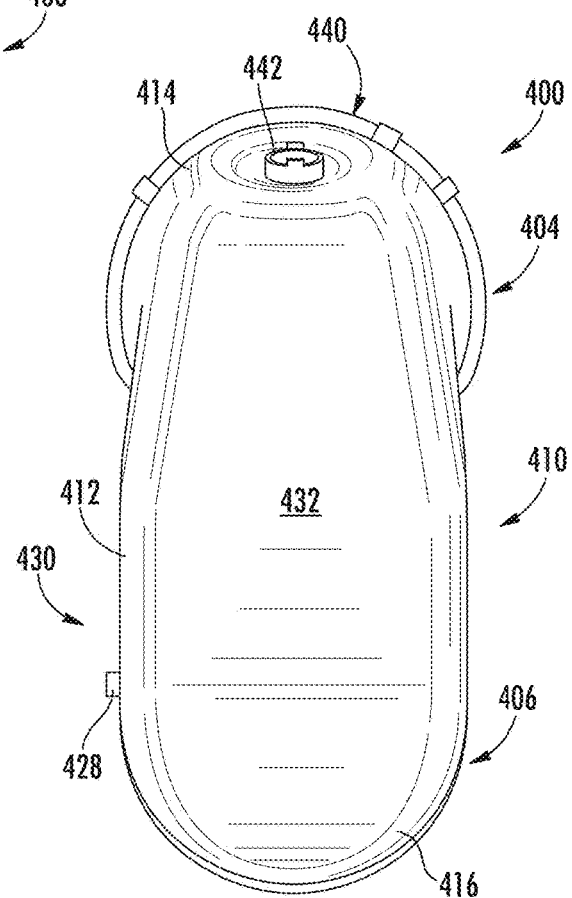
Figure 25:
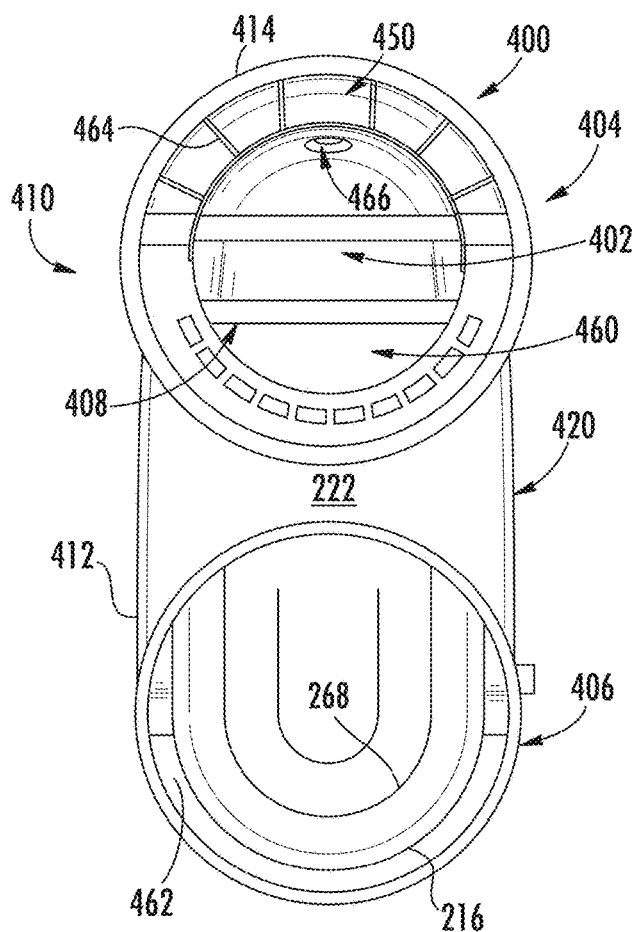
Figure 27:
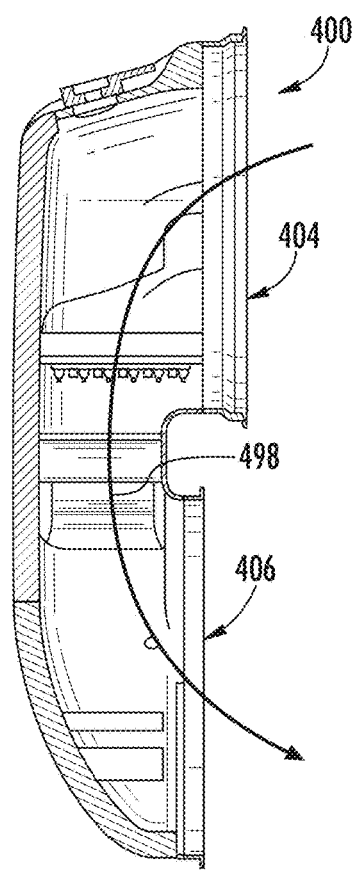
Figure 26:
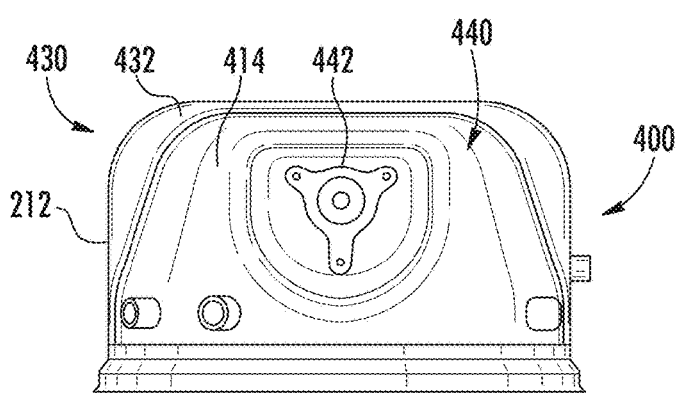
Figure 28:
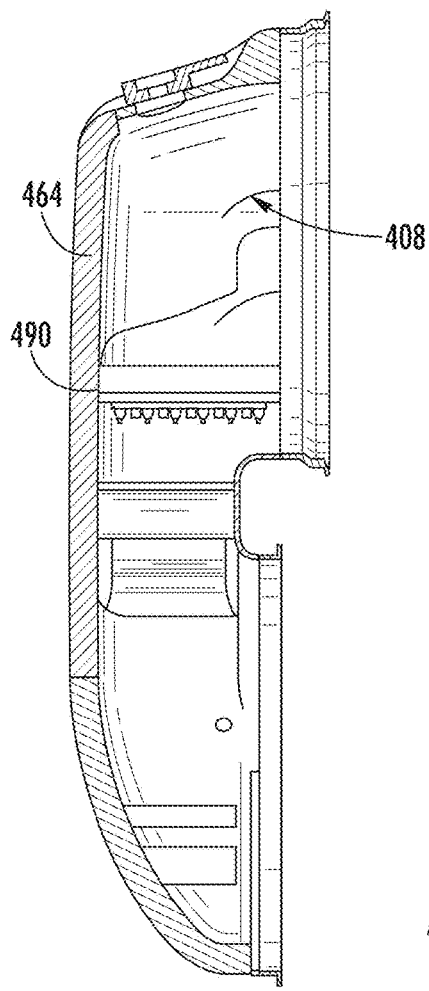
Figure 29:
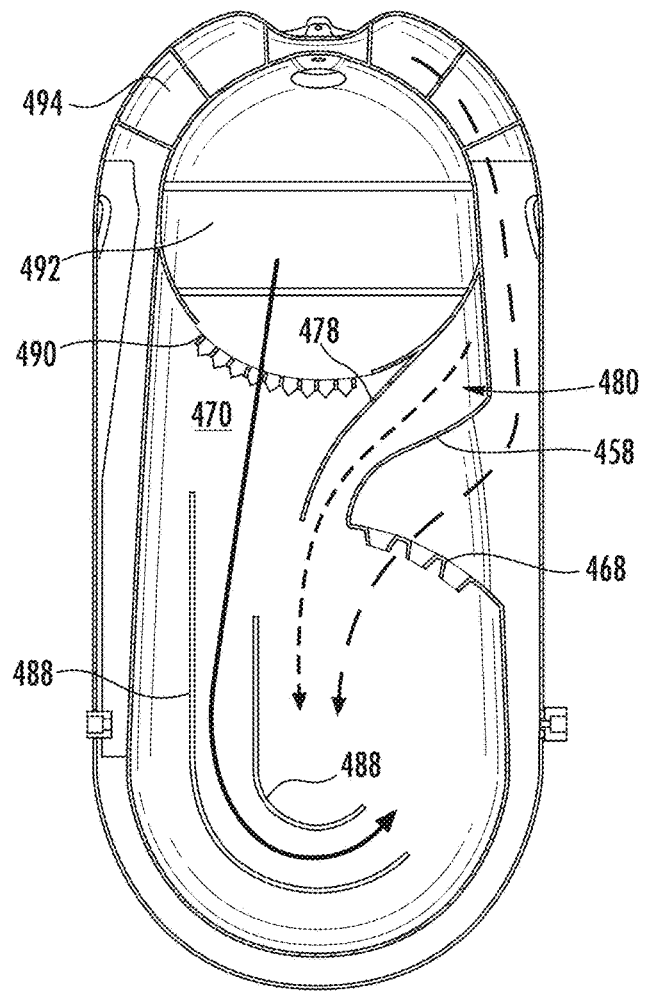
Figure 30:
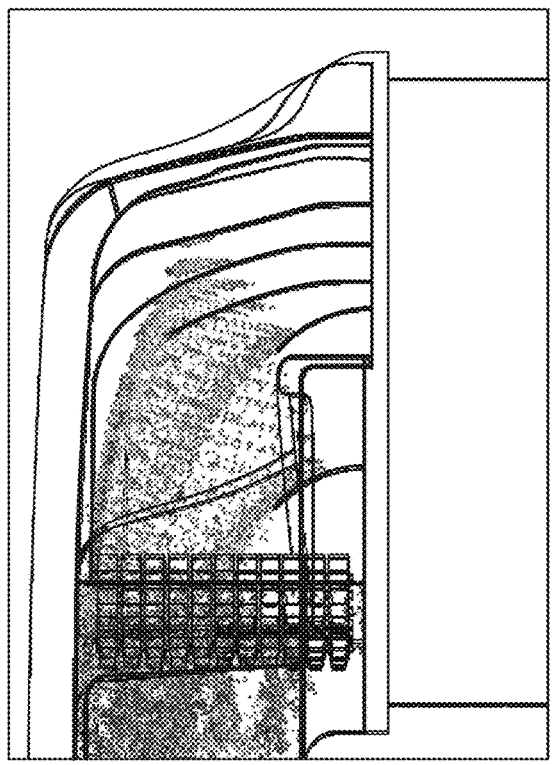
Figure 31:
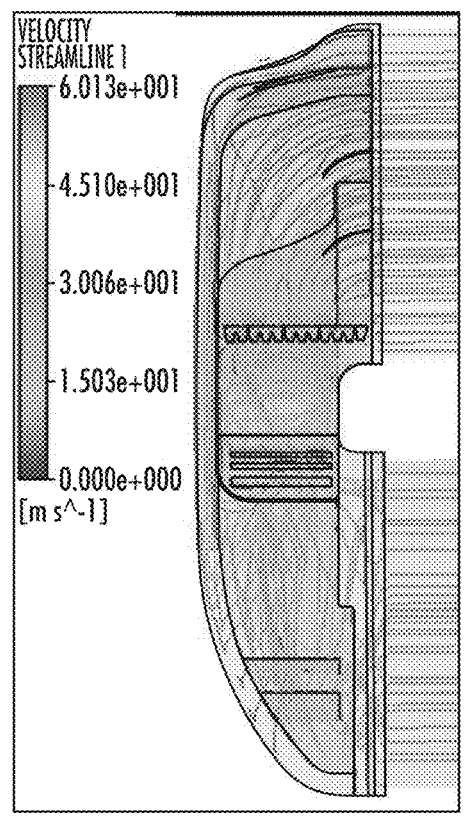
Figure 32:
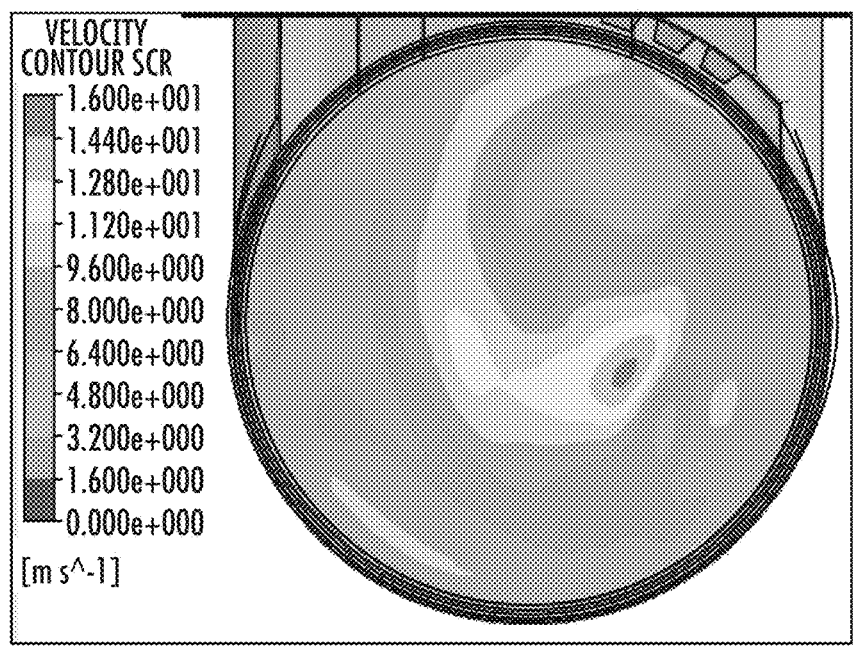
Figure 33:
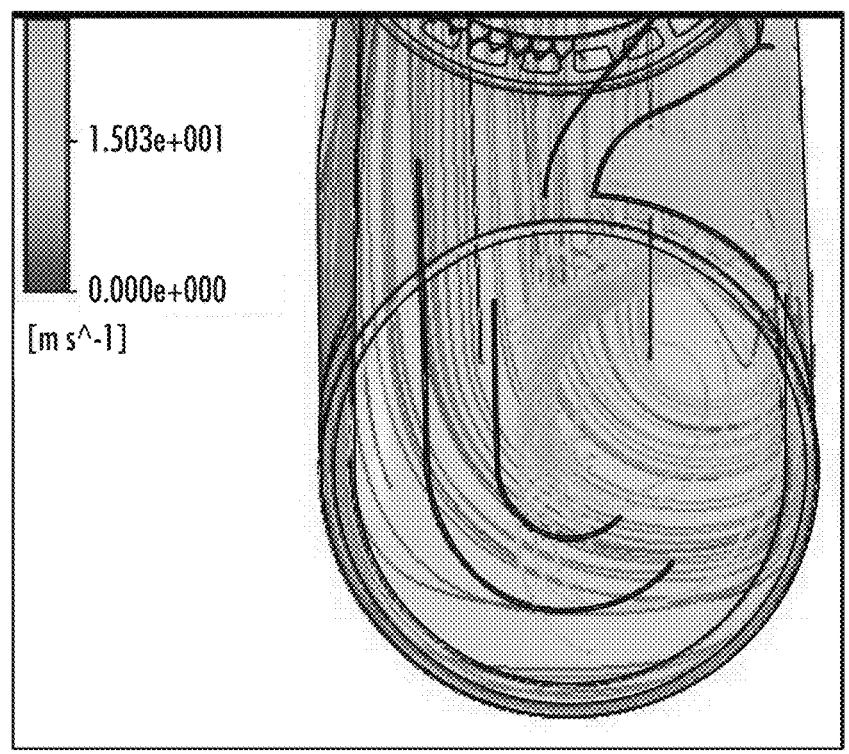
Figure 34A:
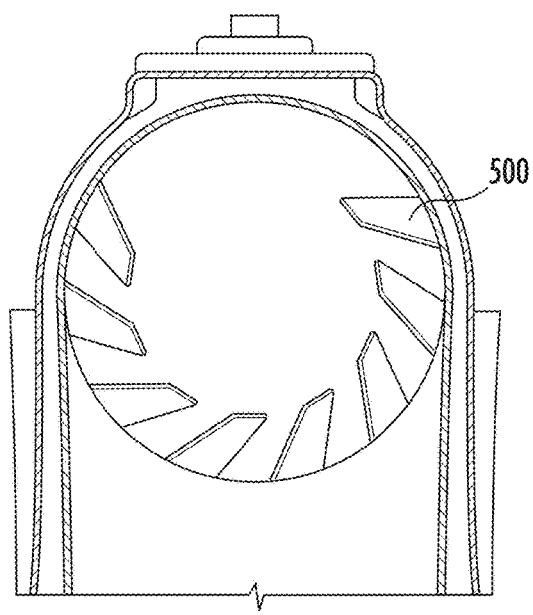
Figure 34B:
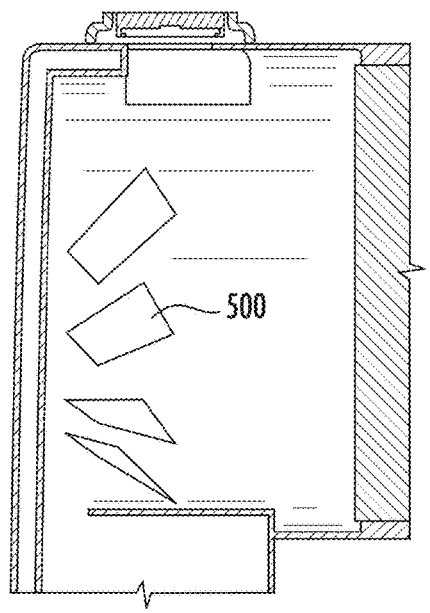
Figure 35A:
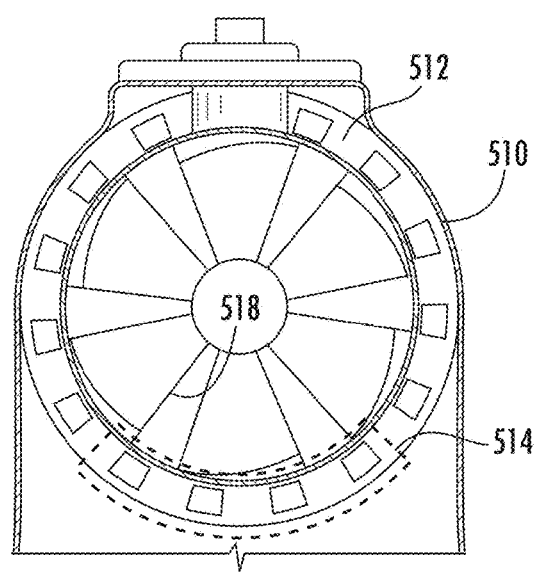
Figure 35B:
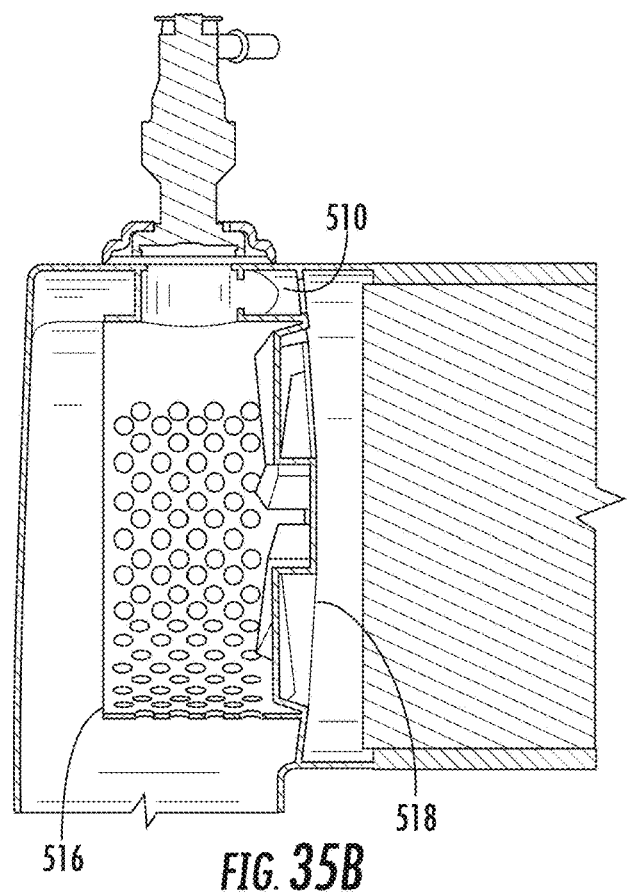
Figure 36:
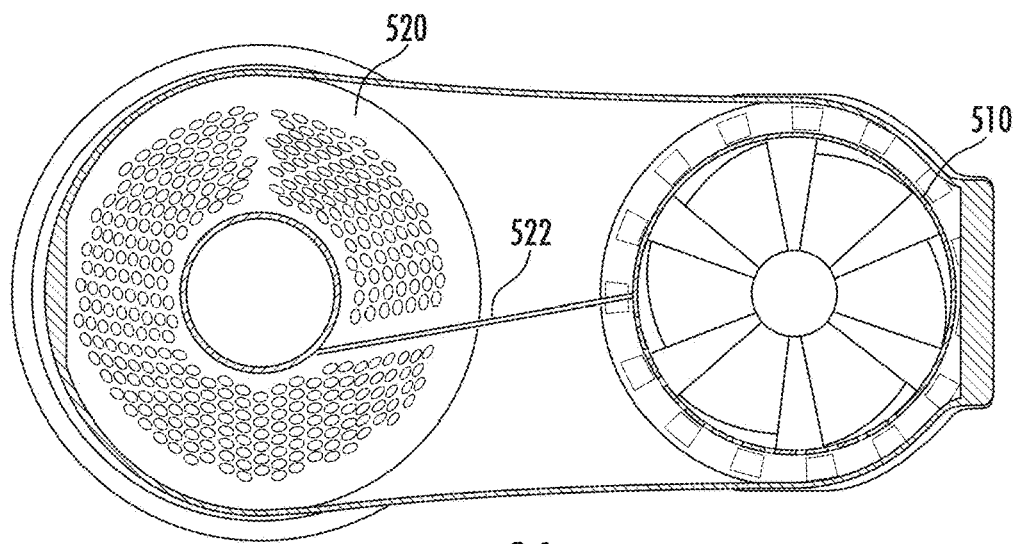
Figure 37A:
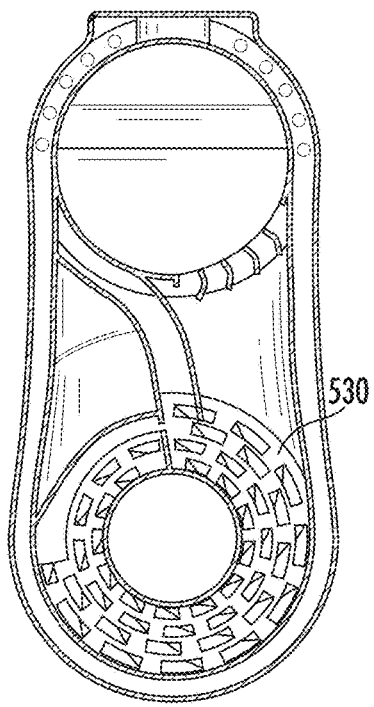
Figure 37B:
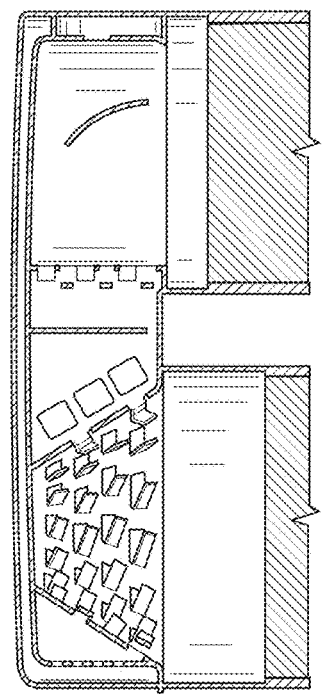
Figure 38A:
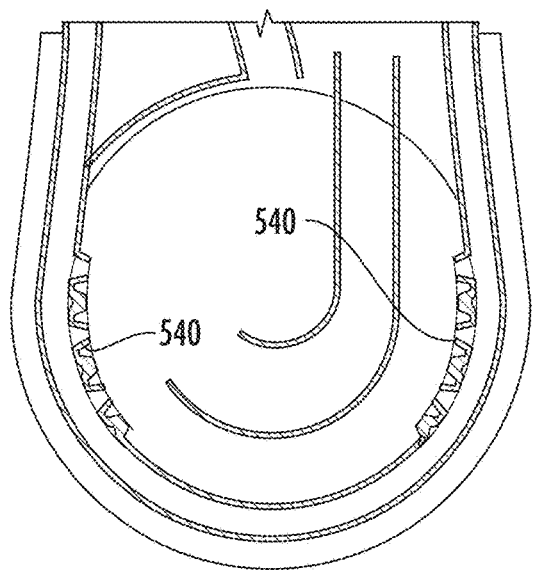
Figure 38B:
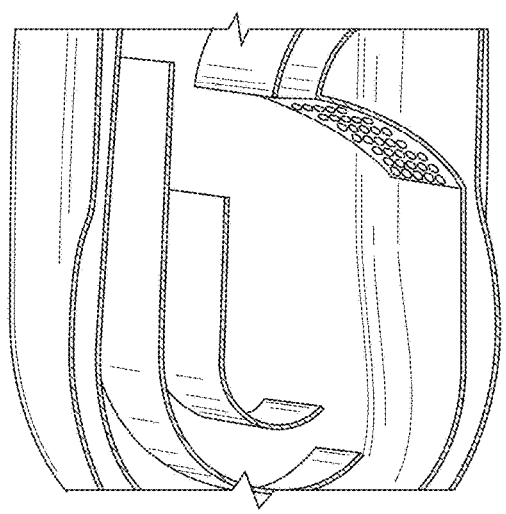
Figure 39B:
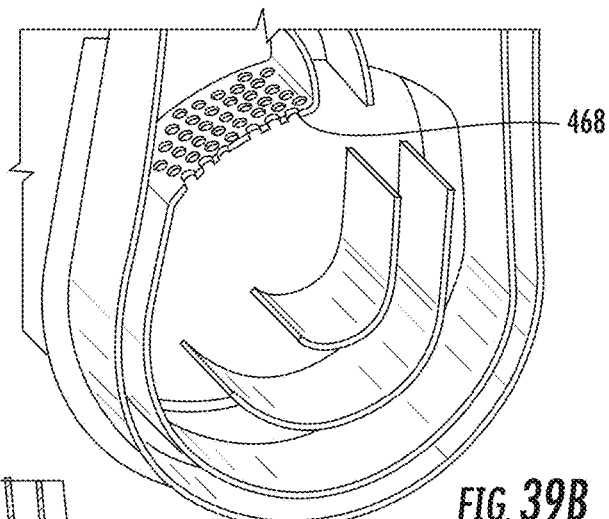
Figure 39A:
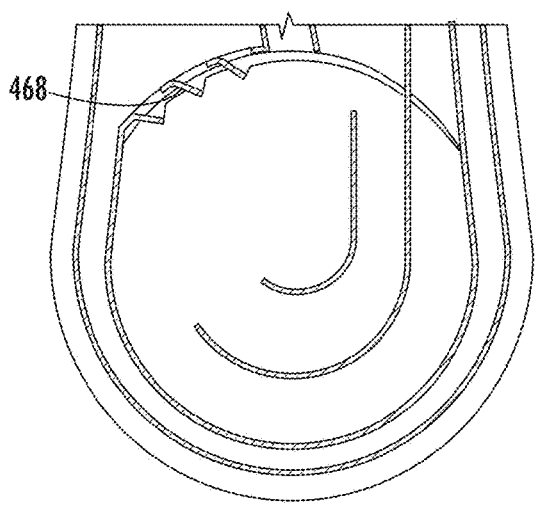
Figure 40:
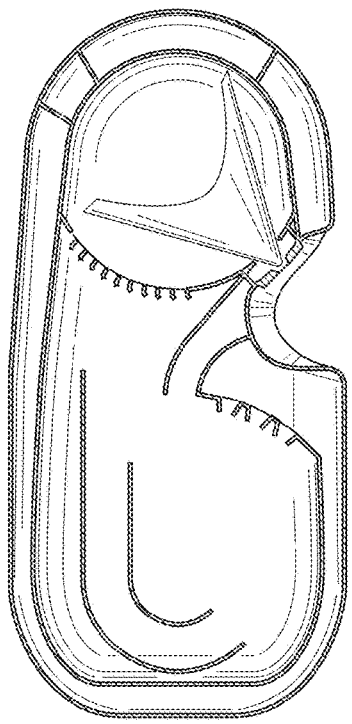
Figure 41A:
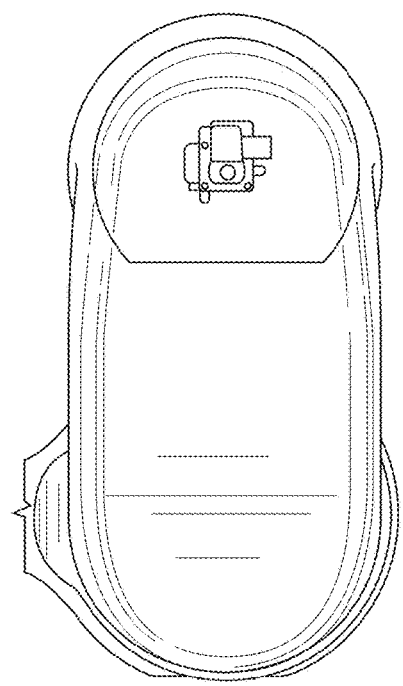
Figure 41B:
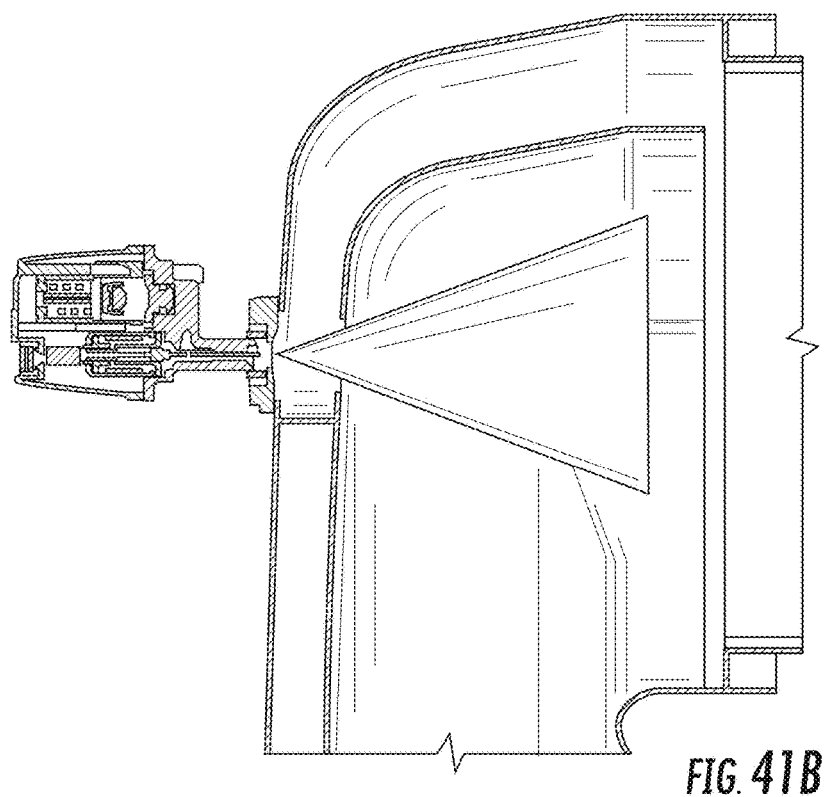

FIGS. 11A and 11B area graphical diagrams of reductant particle flow paths within the reductant decomposition reactor of FIG. 2;

FIG. 12 is a graphical diagram of exhaust particle flow paths within the reductant decomposition reactor of FIG. 2;

FIG. 13 is a graphical diagram of velocities of particles within the reductant decomposition reactor of FIG. 2 at an outlet;

FIGS. 14A and 14B are a cross-sectional and right side view of an implementation of the reductant decomposition reactor of FIG. 2 with slots formed in a flow divider separating a main flow chamber from a thermal management chamber;

FIGS. 15A, 15B, and 15C are a partial perspective, left side, and right side view of an implementation of the reductant decomposition reactor of FIG. 2 with louvres formed in a flow divider separating a main flow chamber from a thermal management chamber;

FIG. 16 is a cross-sectional view of an implementation of the reductant decomposition reactor of FIG. 2 with a flow diversion feature;

FIGS. 17A and 17B are a cross-sectional and right side view of an implementation of the reductant decomposition reactor of FIG. 2 with a transition to a square outlet;

FIGS. 18A and 18B are a cross-sectional and partial perspective view of an implementation of the reductant decomposition reactor of FIG. 2 with perforations formed in a flow divider separating a main flow chamber from a thermal management chamber;

FIGS. 19A, 19B, and 19C are a cross-sectional and right side view of implementations of the reductant decomposition reactor of FIG. 2 with an inner exhaust assist bypass;

FIGS. 20A and 20B are a left side view of the reductant decomposition reactor of FIG. 2 with a reductant doser at a first angled position and a second angled position relative to the decomposition reactor;

FIG. 21 is a cross-sectional view of an implementation of the reductant decomposition reactor of FIG. 2 with an angled opening for one or more flow guide baffles;

FIG. 22 is a perspective view of an implementation of the reductant decomposition reactor of FIG. 2 with one or more flow guide angled baffles positioned within the thermal management flow path;

FIG. 23 is a perspective view of another implementation of a reductant decomposition reactor;

FIG. 24 is a left side view of the reductant decomposition reactor of FIG. 23;

FIG. 25 is a right side view of the reductant decomposition reactor of FIG. 23;

FIG. 26 is a top view of the reductant decomposition reactor of FIG. 23;

FIG. 27 is a cross-sectional view of the reductant decomposition reactor of FIG. 23 showing a flow path of exhaust gas;

FIG. 28 is a cross-sectional view of the reductant decomposition reactor of FIG. 23;

FIG. 29 is another cross-sectional view of the reductant decomposition reactor of FIG. 23 showing the flow path of exhaust gas;

FIG. 30 is a graphical diagram of reductant particle flow paths within the reductant decomposition reactor of FIG. 23;

FIG. 31 is a graphical diagram of exhaust particle flow paths within the reductant decomposition reactor of FIG. 23;

FIG. 32 is a graphical diagram of velocities of particles within the reductant decomposition reactor of FIG. 23 at an outlet;

FIG. 33 is a graphical diagram of velocities of particles within the reductant decomposition reactor of FIG. 23 at an outlet;

FIGS. 34A and 34B are a left cross-sectional and front cross-sectional view of an implementation of the reductant decomposition reactor of FIG. 23 with blades positioned within the inlet;

FIGS. 35A and 35B are a left cross-sectional and front cross-sectional view of an implementation of the reductant decomposition reactor of FIG. 23 with a louvered flange at the inlet;

FIG. 36 is a left cross-sectional view of an implementation of the reductant decomposition reactor of FIG. 23 with a perforated cone;

FIGS. 37A and 37B are a left cross-sectional and front cross-sectional view of an implementation of the reductant decomposition reactor of FIG. 23 with slots and/or formed flared flanges in a cone at an outlet;

FIGS. 38A and 38B are a cross-sectional and partial perspective view of an implementation of the reductant decomposition reactor of FIG. 23 with perforations formed in a wall of the thermal management flow path;

FIGS. 39A and 39B are a cross-sectional and partial perspective view of an implementation of the reductant decomposition reactor of FIG. 23 with an exhaust assist bypass;

FIG. 40 is a cross-sectional view of the reductant decomposition reactor of FIG. 23 with a reductant doser at a centrally mounted position relative to the decomposition reactor; and FIGS. 41A and 41B are a partial cross-sectional and left side view of an implementation of the reductant decomposition reactor of FIG. 23 with an exterior mounted reductant doser.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for reductant decomposition chambers. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In exhaust aftertreatment systems, a decomposition reactor chamber is utilized to let dosed reductant mix with exhaust gases upstream of a catalyst for reducing compounds in the exhaust gas into more neutral compounds. In some implementations, a long, linear decomposition reactor chamber can be used to permit sufficient residence time for the dosed reductant to mix with the exhaust gases flowing through the aftertreatment system. However, spacing constraints may restrict the available length of the decomposition reactor chamber. A reduced length may limit residency time, which can affect reductant dispersion uniformity, and/or can result in reductant deposit formation.

A compact decomposition reactor chamber with reduced length may provide sufficient residency time for reductant to disperse into the flowing exhaust gas. In some implementations, a compact decomposition reactor chamber may be a U-shaped or V-shaped chamber where the inlet and outlet are located on the same side or within the same plane, such as a switchback exhaust flow path configuration. For such compact decomposition reactor chambers, several factors may be considered, such as maximizing flow uniformity and reductant evaporation, minimizing reductant deposits, minimizing ambient effects on exhaust flow through the outlet, minimizing pressure restriction or drop, minimizing decomposition reactor chamber space claim, and/or minimizing cost. The implementations described herein improve one or more of the foregoing factors while reducing the decomposition reactor's axial and transverse footprint or size.

II. Overview of Aftertreatment System

Figure 1:
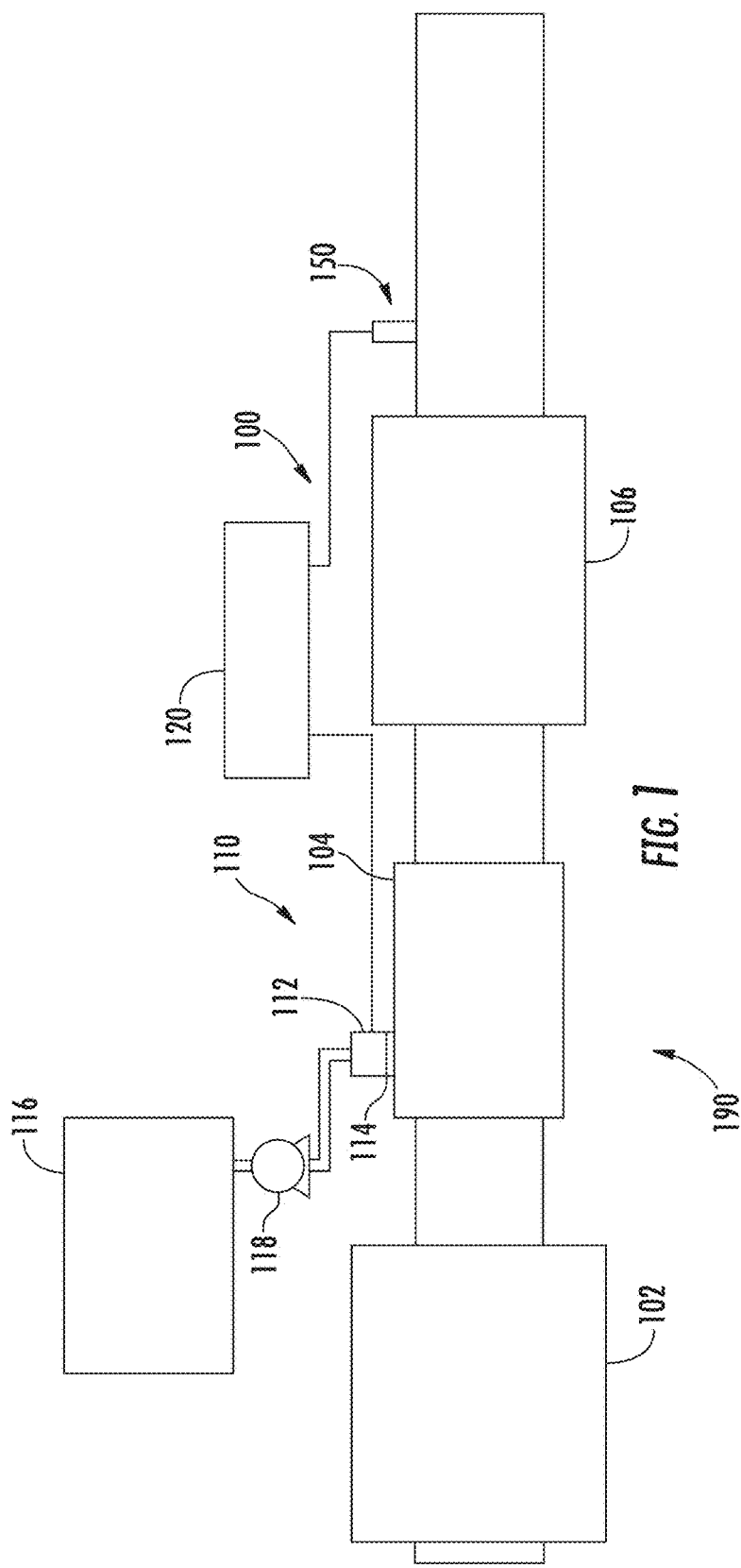
FIG. 1 is a block schematic diagram of an example selective catalytic reduction system having an example reductant delivery system for an exhaust system.

FIG. 1 depicts an aftertreatment system 100 having an example reductant delivery system 110 for an exhaust system 190. The aftertreatment system 100 includes a particulate filter, for example a diesel particulate filter (DPF) 102, the reductant delivery system 110, a decomposition chamber or reactor pipe 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea or diesel exhaust fluid (DEF), into ammonia. The decomposition chamber 104 includes a reductant delivery system 110 having a doser 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the doser 112 mounted to the decomposition chamber 104 such that the doser 112 may dose the reductant into the exhaust gases flowing in the exhaust system 190. The doser 112 may include an insulator 114 interposed between a portion of the doser 112 and the portion of the decomposition chamber 104 to which the doser 112 is mounted. The doser 112 is fluidly coupled to one or more reductant sources 116. In some implementations, a pump 118 may be used to pressurize the reductant from the reductant source 116 for delivery to the doser 112.

The doser 112 and pump 118 are also electrically or communicatively coupled to a controller 120. The controller 120 is configured to control the doser 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include an oxidation catalyst, for example a diesel oxidation catalyst (DOC), in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit, such as a DPF with SCR-coating (SDPF). In some implementations, the doser 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or size sensor 150 with each sensor 150 located at one of the foregoing positions of the exhaust system 190.

III. Implementations of Decomposition Reactors for an Aftertreatment System

FIGS. 2-10 depict an implementation of a U-shaped decomposition reactor 200 that can improve evaporation, mixing, and heat transfer of reductant with exhaust gases flowing therein with a reduced center-to-center distance between an inlet and an outlet of the decomposition reactor 200. The decomposition reactor 200 includes a main flow chamber 202 and a thermal management chamber 250. The main flow chamber 202 may include one or more walls or partitions to form one or more channels. In the implementation shown, the decomposition chamber 200 includes an inlet 204 and an outlet 206 such that fluid flow through the decomposition reactor 200 flows in the direction 298 shown in FIG. 6. The inlet 204 and the outlet 206 are located in parallel planes such that the decomposition reactor 200 receives exhaust gas in a first direction through the inlet 204 and transmits a mixture of reductant and exhaust gas through the outlet 206 in a second direction that is substantially opposite the first direction (e.g., substantially opposite for the second direction means 180 degrees±5 degrees relative to the first direction). In other implementations, the inlet 204 and the outlet 206 may be located in substantially the same plane (e.g., substantially means within a distance of 5% of the total height of the decomposition reactor 200). In yet other implementations, the inlet 204 and the outlet 206 can be at angles relative to each other (e.g., a V-shaped decomposition chamber). In such implementations, the second direction of the flow of reductant and exhaust gas out the outlet 206 is at an angle relative to the first direction. The angle may be from 0 degrees, inclusive, to 360 degrees. In still further implementations, the inlet 204 and outlet 206 may be clocked relative to each other and/or an axis of the decomposition reactor 200, such as from 0 degrees, inclusive, to 360 degrees. Thus, the inlet 204 and the outlet 206 may be orientated at any angle relative to each other and to the decomposition reactor 200. The inlet 204 can include a flange or other mounting component for mechanically coupling the inlet to an upstream component, such as another exhaust tube or another aftertreatment device. The outlet 206 can also include a flange or other mounting component for mechanically coupling the outlet 206 to a downstream component, such as another exhaust tube or another aftertreatment device.

The decomposition reactor 200 includes an exterior component 210 connecting the inlet 204 to the outlet 206 and defining an interior volume of the decomposition reactor 200. The exterior component 210 can be U-shaped, V-shaped, or any other configuration based on the orientation of the inlet 204 relative to the decomposition reactor 200 and the outlet 206. The exterior component 210 includes an inner wall 222, sidewalls 212, an outer wall 232, an upper wall 214, and a lower wall 216. In the implementation shown, the inner wall 222, sidewalls 212, outer wall 232, upper wall 214, and lower wall 216 include curves and/or smoothed interfaces to provide for smoother fluid flow within the exterior component 210 and increased structural strength. In other implementations, the inner wall 222, sidewalls 212, outer wall 232, upper wall 214, and lower wall 216 can be flat walls to define a box-like structure.

In some implementations, the exterior component 210 can be formed by two or more pieces. For instance, in the implementation shown, the exterior component 210 has an inner member 220, and outer member 230, and a doser mounting member 240 that can be separately formed and/or stamped and then coupled (e.g., welded or otherwise connected) together to from the exterior component 210. The multiple component configuration can permit variations to the different members 220, 230, 240 to vary the performance, sizing, positioning or other features of the decomposition reactor 200.

The inner member 220 defines an inner wall 222 for the decomposition reactor 200 and can include one or more openings and/or mounts 228 for coupling one or more components to the decomposition reactor 200, such as sensors. The inner wall 222 can have a flat inner surface, a curved inner surface, or a combination thereof and extends from a portion of the inlet 204 to a portion of the outlet 206. The inner wall 222 can also include one or more sidewall portions 223 defining a portion of the sidewalls 212 of the decomposition reactor 200. The one or more sidewall portions 223 can be flat walls, curved walls, or a combination thereof. The inner wall 222 includes a first semicircular or other arcuate opening 224 to form the inlet 204 and a second semicircular or other arcuate opening 226 to form the outlet 206 when the inner member 220 is combined with the outer member 230 and/or the doser mount member 240. In some instances, the inner member 220 is a stamped, cast, or mechanically formed steel member.

The outer member 230 defines at least part of an outer wall 232 for the decomposition reactor 200. The outer wall 232 can have a flat outer surface or can have a curved outer surface. In some instances, the outer wall 232 can have both a flat portion and a curved portion, such as an upstream flat portion that transitions to a downstream curved portion. The outer member 230 also includes one or more sidewall portions 233 that, when coupled to the one or more sidewall portions 223 of the inner member 220, define the sidewalls 212 of the exterior component 210. The one or more sidewall portions 233 may also be flat walls, curved walls, or a combination thereof. The outer member 230 further defines the lower wall 216 to connect the outer wall 232 to the outlet 206. In some instances, the outer member 230 can include one or more openings and/or mounts for coupling one or more components to the decomposition reactor 200, such as sensors.

The doser mount member 240 includes a doser mount 242 and defines the upper wall 214 of the exterior component 210. In some implementations, the doser mount member 240 may also include a portion for the outer wall 232 and/or sidewalls 212. In the implementation shown, the doser mount member 240 includes an indentation or other feature to form a flat surface for the doser mount 242. In other instances, the doser mount member 240 can include a protrusion or other feature to form a flat surface for the doser mount 242. In still further instances, the doser mount member 240 can include an opening for an interface component that includes a surface to which the doser mount 242 is coupled. The doser mount 242 includes an opening through which a portion of a doser or a nozzle may be inserted into the exterior component 210 for dosing reductant or another fluid therein. The doser mount 242 also includes one or more attachment features, such as bolt holes, welding mount tabs, etc., for coupling a doser to the doser mount 242.

Within the exterior component 210, the decomposition reactor 200 includes a flow divider 260 that divides the main flow chamber 202 from the thermal management chamber 250 and defines the shape and size of the main flow chamber 202 (shown best in FIG. 9) in cooperation with the inner wall 222 of the inner member 220. The main flow chamber 202 is fluidly coupled to the inlet 204 and the outlet 206. The flow divider 260 includes a downstream flange 262 to couple to the outlet 206 and/or the exterior component 210. The flow divider 260 also includes one or more flow guide baffles 264 to couple to the inlet 204 and/or the exterior component 210. The downstream flange 262 and the one or more flow guide baffles 264 mechanically couple the flow divider 260 to the exterior component 210 such that exhaust can flow within the flow divider 260 along the main flow chamber 202 and in the thermal management chamber 250 defined by the space between the flow divider 260 and the exterior component 210. The flow divider 260 includes an opening 266 through which dosed reductant is sprayed into the main flow chamber 202. The wider opening to the thermal management chamber 250 at the inlet 204 increases the mass flow of the exhaust gas and, in turn, increases flow velocities through the opening 266. In some implementations, the doser mount member 240 can include a partition that extends between the doser mount member 240 and the flow divider 260 downstream of the opening 266 such that flow through the thermal management chamber 250 is redirected through the opening 266 to provide an exhaust assist to dosed reductant sprayed into the opening 266. In the implementation shown, the doser mount member 240 includes an indentation to reduce a distance between a doser nozzle and the opening 266. The indentation on the doser mount member 240 can reduce the likelihood of recirculation and trapping of reductant droplets at the doser. These features can be aligned with respect to flow direction to help smoothen the flow and avoid recirculation.

In the implementation shown, the inlet 204 includes one or more slats 208 spanning across at least a portion of the inlet 204. The one or more slats 208 are shown as curved plates or airfoils to redirect incoming exhaust gas flow into the decomposition reactor 200. That is, the one or more slats 208 are configured to redirect incoming exhaust gas flow from a first direction at the inlet 204 to a second direction that is different than the first direction. In some implementations, the one or more slats 208 can be flat plates. In some instances the one or more slats 208 can include perforations. In still other instances, turbulators or vaning or other flow control features can be included on each of or one of the one or more slats 208. The one or more slats 208 may also reduce the likelihood of dosed reductant droplets travelling upstream out the inlet 204.

The main flow chamber 202 also includes a mixer 290 within the main flow chamber 202. The mixer 290 is coupled to the interior of the flow divider 260 and mixes the incoming exhaust gas with dosed reductant within the decomposition reactor 200. In some implementations, the mixer 290 can be a cross-vaned mixer located at a mid-span of the decomposition reactor 200 to assist in the breaking down of the reductant droplets, reducing recirculation/flow separation due to the flow redirection within the decomposition reactor 200, and improving flow distribution. Alternatively, the mixer 290 can be a louvered flange or swirl blades. The mixer 290 mixes the exhaust gas and dosed reductant within the main flow chamber 202 and increases mixing by reducing particle size and improving evaporation.

The thermal management chamber 250 is defined by the volume between the flow divider 260 and the exterior component 210. In the implementation shown, the thermal management chamber 250 includes one or more flow guide baffles 264 from the inlet 204 and along at least a portion of the volume defined by the outer wall 232 and the flow divider 260. In some instances, the one or more flow guide baffles 264 extend to a distance that is greater than 50% of the length of the outer wall 232. In some instances, the one or more flow guide baffles 264 extend to a distance that is less than 50% of the length of the outer wall 232.

The flow divider 260 also includes one or more openings 268, such as perforations, slots, louvers, etc., through which flow from the thermal management chamber 250 is recombined with downstream flow of the main flow chamber 202. As noted above, a downstream flange 262 can be couple to the outlet 206 and/or the exterior component 210 to fluidly seal the flow divider to the outlet 206 and/or exterior component 210 such that all of the exhaust gas flow from the thermal management chamber 250 is directed through the one or more openings 268. The one or more openings 268 can be perforated cones at the exit of thermal management chamber 250 to increase flow velocity and reducing reductant droplets from impacting the outlet end surface of the flow divider 260. The perforated cone design may help to avoid droplets entering the thermal management chamber 250. In other implementations, the one or more openings 268 can be slots, holes, or other shaped bypass passages.

In operation, incoming exhaust gas is split into a first flow path through the main flow chamber 202 and a second flow path through the thermal management chamber 250. A ratio of a first area of exposure 280 for flow from the inlet 204 into the main flow chamber 202 to a second area of exposure 282 for flow into the thermal management chamber 250 from the inlet 204 controls the mass flow of incoming exhaust gas into the main flow chamber 202 and the thermal management chamber 250. The ratio for the first area of exposure 280 and the second are of exposure 282 can vary based on the configuration of the system, the doser, etc. In some implementations, the ratio can be between 7%, inclusive, and 20%, inclusive for percentage ratio of the first area of exposure 280 to the second area of exposure 282.

Exhaust gas mass flow into the main flow chamber 202 is mixed with reductant dosed through the opening 266 in the flow divider 260 and flows downstream to the mixer 290 positioned within the main flow chamber 202 to further mix. The exhaust gas mass flow of the thermal management chamber 250 is recombined with the exhaust gas mass flow from the main chamber at the outlet 206 via reintroduction of the exhaust gas mass flow of the thermal management chamber 250 through the one or more openings 268.

The bypass of untreated exhaust gas flow through the thermal management chamber 250 is used to control a temperature of the flow divider 260 at desired temperature, such as 160 degrees Celsius or greater. In some implementations, the desired temperature may be 200 degrees Celsius. In some implementations, the desired temperature may be greater than a surface exposed to an ambient temperature. For instance, the thermal management chamber 250 may maintain the flow divider 260 at a temperature of 200 degrees Celsius while an exterior wall, such as a system without the thermal management chamber, may only achieve a temperature of 115 degrees Celsius. By controlling the temperature of the flow divider 260 at the desired temperate, the dosed reductant droplets that come into contact with the flow divider 260 evaporate to reduce the formation of deposits, even if wall wetting occurs on an inner wall surface of the flow divider 260.

The one or more flow guide baffles 264 provided in the thermal management chamber 250 spread the untreated exhaust gas flow within the thermal management chamber 250 to provide passive thermal management control. For instance, the one or more flow guide baffles 264 can be evenly spaced to provide substantially uniform amounts of exhaust gas mass flow through different portions of the thermal management chamber 250 such that the flow divider 260 is maintained at a substantially uniform temperature. In other instances, the one or more flow guide baffles 264 can be asymmetrically spaced to provide varying amounts of exhaust gas mass flow through different portions of the thermal management chamber 250 such that the flow divider 260 is maintained at a desired temperature profile or gradient.

In other instances, the one or more flow guide baffles 264 can direct more or less exhaust gas mass flow to different regions of the flow divider 260 to provide increased or decreased temperatures at different portions of the flow divider 260. For instance, the one or more flow guide baffles 264 may be configured to concentrate untreated exhaust gas flow at a region of the flow divider 260 where deposit formation is likely. That is, a distance between two of the one or more flow guide baffles 264 can narrow or otherwise reduce a cross-sectional area for exhaust gas flowing through a portion of the thermal management chamber 250 to increase a velocity of exhaust gas flow over a corresponding portion of the flow divider 260. The increased velocity of exhaust gas over the portion of the flow divider 260 increases convective heat transfer, thereby increasing a temperature of that portion of the flow divider 260. Similarly, a distance between two of the one or more flow guide baffles 264 can increase or otherwise increase a cross-sectional area for exhaust gas flowing through a portion of the thermal management chamber 250 to decrease a velocity of exhaust gas flow over a corresponding portion of the flow divider 260. The decreased velocity of exhaust gas over the portion of the flow divider 260 decreases convective heat transfer, thereby decreasing a temperature of that portion of the flow divider 260. Thus, the configuration of the one or more flow guide baffles 264 within the thermal management chamber 250 can be configured to provide non-uniform temperatures for the flow divider 260.

In some implementations, a portion of the untreated exhaust gas along the second flow path in the thermal management chamber can be redirected by the partition that extends between the doser mount member 240 and the flow divider 260 downstream of the opening 266 such that flow through the thermal management chamber 250 is redirected through the opening 266 to provide an exhaust assist to dosed reductant sprayed into the opening 266. In other instances, the partition may be omitted and exhaust flow within the thermal management chamber 250 may still flow through the opening 266 to provide an exhaust assist to the dosed reductant.

In some implementations, the decomposition reactor 200 can included smoothened inlet and outlet corners and/or curved back and side walls to provide additional smooth flow transition in a more compact decomposition reactor 200 width with a reduced center to center distance between the inlet 204 and outlet 206. The smoothened corners and/or walls can reduce flow recirculation and flow separation, which can improve flow distribution and uniformity within the decomposition reactor 200. The curved back and/or sidewalls can also increase structural strength and reduce acoustic vibrations of the decomposition reactor 200.

FIGS. 11A and 11B depict reductant particle flow paths within the reductant decomposition reactor 200 and shows the redirection of reductant particles off of the one or more slats 208 at the inlet 204 to reduce upstream reductant spray. FIG. 12 depicts exhaust particle flow paths within the reductant decomposition reactor 200 from the inlet 204 to the outlet 206, including the flow paths from upstream and downstream components or exhaust piping. FIG. 13 depicts the velocities of particles within the reductant decomposition reactor 200 at the outlet 206, which shows substantial uniform velocities at the exit.

FIG. 14 depicts an implementation of the decomposition reactor 200 with slots 300 or louvers formed in the downstream flange 262. The slots 300 can form exhaust gas jets having increased velocity relative to the velocity of exhaust gas flowing through the main flow chamber 202 to redirect to exhaust gas flow out the outlet 206 and/or reduce the likelihood of reductant droplets forming between the downstream flange 262 and the outlet 206.

FIGS. 15A, 15B, and 15C depict an implementation of the decomposition reactor 200 with louvers 310 formed in the flow divider 260 and positioned proximate the inlet 204.

FIG. 16 depicts an implementation of the decomposition reactor 200 with a flow diversion feature 320 formed in the flow divider 260. The flow diversion feature 320 is an indentation or a protrusion into the main flow chamber 202 to reduce flow recirculation.

FIGS. 17A and 17B depict an implementation of the decomposition reactor 200 with a transition to a square outlet 330 instead of the circular outlet 206. Of course other geometric configurations for the outlet 206 and/or inlet 204 can be implemented, such as triangular, rectangular, hexagonal, octagonal, etc.

FIGS. 18A and 18B depict an implementation of the decomposition reactor 200 with perforations 340 formed in the flow divider 260 such that exhaust gas flow from the thermal management chamber 250 transfers to the main flow chamber 202.

FIGS. 19A, 19B, and 19C depict an implementation of the decomposition reactor 200 with an inner exhaust assist bypass 350. The inner exhaust assist bypass 350 includes a wall 352 separating the inner exhaust assist bypass 350 from the main flow chamber 202 to define a bypass chamber 354. The inner exhaust assist bypass 350 includes an opening 356 to collect exhaust gas from the inlet 204 and an exit 358 to expel the collected gas at the outlet 206. The inner exhaust assist bypass 350 can impart velocity to the exhaust gas at the outlet 206 to reduce the flow recirculation and, hence, the likelihood of reductant droplets depositing on an inner wall of a downstream component.

FIGS. 20A and 20B depict an implementation of the decomposition reactor 200 with a reductant doser 360 mounted at a first angled position and also at a second angled position relative to the decomposition reactor 200. Thus, the doser mount 242 can be positioned at any point on the doser mount member 240 and/or anywhere else on the exterior component 210.

FIG. 21 depicts an implementation of the decomposition reactor 200 with an angled opening to the one or more flow guide baffles 264 from the inlet 204 to the opening 266 formed through the flow divider 260. The angled opening can permit increased mass flow of exhaust gas to be captured at the inlet 204 and conveyed through the opening 266 to provide added velocity to the dosed reductant therethrough.

FIG. 22 depicts an implementation of the decomposition reactor 200 with angled flow guide baffles 264 positioned within the thermal management chamber 250.

FIGS. 23-29 depict another implementation of a U-shaped decomposition reactor 400 that can improve evaporation, mixing, and heat transfer of reductant with exhaust gases flowing therein with a reduced center-to-center distance between an inlet and an outlet of the decomposition reactor 400. The decomposition reactor 400 includes a main flow chamber 402 and a thermal management chamber 450. The main flow chamber 402 may include one or more walls or partitions to form one or more channels. In the implementation shown, the decomposition chamber 400 includes an inlet 404 and an outlet 406 such that fluid flow through the decomposition reactor 400 flows in the direction 498 shown in FIG. 27. The inlet 404 and the outlet 406 are located in parallel planes such that the decomposition reactor 400 receives exhaust gas in a first direction through the inlet 404 and transmits a mixture of reductant and exhaust gas through the outlet 406 in a second direction that is substantially opposite the first direction (e.g., substantially opposite for the second direction means 180 degrees±5 degrees relative to the first direction).). In other implementations, the inlet 404 and the outlet 406 may be located in substantially the same plane (e.g., substantially means within a distance of 5% of the total height of the decomposition reactor 200). In other implementations, the inlet 404 and the outlet 406 can be at angles relative to each other (e.g., a V-shaped decomposition chamber). In such implementations, the second direction of the flow of reductant and exhaust gas out the outlet 406 is at an angle relative to the first direction. The angle may be from 0 degrees, inclusive, to 360 degrees. In still further implementations, the inlet 204 and outlet 206 may be clocked relative to each other and/or an axis of the decomposition reactor 200, such as from 0 degrees, inclusive, to 360 degrees. Thus, the inlet 204 and the outlet 206 may be orientated at any angle relative to each other and to the decomposition reactor 200. The inlet 404 can include a flange or other mounting component for mechanically coupling the inlet to an upstream component, such as another exhaust tube or another aftertreatment device. The outlet 406 can also include a flange or other mounting component for mechanically coupling the outlet 406 to a downstream component, such as another exhaust tube or another aftertreatment device.

The decomposition reactor 400 includes an exterior component 410 connecting the inlet 404 to the outlet 406 and defining an interior volume of the decomposition reactor 400. The exterior component 410 can be U-shaped, V-shaped, or any other configuration based on the orientation of the inlet 204 relative to the decomposition reactor 200 and the outlet 206. The exterior component 410 includes an inner wall 422, sidewalls 412, an outer wall 432, an upper wall 414, and a lower wall 416. In the implementation shown, the inner wall 422, sidewalls 412, outer wall 432, upper wall 414, and lower wall 416 include curves and/or smoothed interfaces to provide for smoother fluid flow within the exterior component 410 and increased structural strength. In other implementations, the inner wall 422, sidewalls 412, outer wall 432, upper wall 414, and lower wall 416 can be flat walls to define a box-like structure.

In some implementations, the exterior component 410 can be formed by two or more pieces. For instance, in the implementation shown, the exterior component 410 has an inner member 420, and outer member 430, and a doser mounting member 440 that can be separately formed and/or stamped and then coupled (e.g., welded or otherwise connected) together to from the exterior component 410. The multiple component configuration can permit variations to the different members 420, 430, 440 to vary the performance, sizing, positioning or other features of the decomposition reactor 400.

The inner member 420 defines an inner wall 422 for the decomposition reactor 400 and can include one or more openings and/or mounts 428 for coupling one or more components to the decomposition reactor 400, such as sensors. The inner wall 422 can have a flat inner surface, a curved inner surface, or a combination thereof and extends from a portion of the inlet 404 to a portion of the outlet 406. The inner wall 422 can also include one or more sidewall portions 423 defining a portion of the sidewalls 412 of the decomposition reactor 400. The one or more sidewall portions 423 can be flat walls, curved walls, or a combination thereof. The inner wall 422 includes a first semicircular or other arcuate opening 424 to form the inlet 404 and a second semicircular or other arcuate opening 426 to form the outlet 406 when the inner member 420 is combined with the outer member 430 and/or the doser mount member 440. In some instances, the inner member 420 is a stamped, cast, or mechanically formed steel member.

The outer member 430 defines at least part of an outer wall 432 for the decomposition reactor 400. The outer wall 432 can have a flat outer surface or can have a curved outer surface. In some instances, the outer wall 432 can have both a flat portion and a curved portion, such as an upstream flat portion that transitions to a downstream curved portion. The outer member 430 also includes one or more sidewall portions 433 that, when coupled to the one or more sidewall portions 423 of the inner member 420, define the sidewalls 412 of the exterior component 410. The one or more sidewall portions 433 may also be flat walls, curved walls, or a combination thereof. The outer member 430 further defines the lower wall 416 to connect the outer wall 432 to the outlet 406. In some instances, the outer member 430 can include one or more openings and/or mounts for coupling one or more components to the decomposition reactor 400, such as sensors.

The doser mount member 440 includes a doser mount 442 and defines the upper wall 414 of the exterior component 410. In some implementations, the doser mount member 440 may also include a portion for the outer wall 432 and/or sidewalls 412. In the implementation shown, the doser mount member 440 includes an indentation or other feature to form a flat surface for the doser mount 442. In other instances, the doser mount member 440 can include a protrusion or other feature to form a flat surface for the doser mount 442. In still further instances, the doser mount member 440 can include an opening for an interface component that includes a surface to which the doser mount 442 is coupled. The doser mount 442 includes an opening through which a portion of a doser or a nozzle may be inserted into the exterior component 410 for dosing reductant or another fluid therein. The doser mount 442 also includes one or more attachment features, such as bolt holes, welding mount tabs, etc., for coupling a doser to the doser mount 442. The doser mount 242 can be positioned radially up to 90 to 135 degrees from the upper wall 414 depending upon the position of features within the decomposition reactor 400, such as shown in FIG. 40. In some implementations, the doser mount 442 may be positioned on the outer wall 432 opposite the inlet 404, such as shown in FIG. 41.

Within the exterior component 410, the decomposition reactor 400 includes a flow divider 460 that divides the main flow chamber 402 from the thermal management chamber 450 and defines the shape and size of the main flow chamber 402 (shown best in FIG. 29) in cooperation with the inner wall 422 of the inner member 420. The main flow chamber 402 is fluidly coupled to the inlet 404 and the outlet 406. The flow divider 460 includes a downstream flange 462 to couple to the outlet 406 and/or the exterior component 410. The flow divider 460 also includes one or more flow guide baffles 464 to couple to the inlet 404 and/or the exterior component 410. The downstream flange 462 and the one or more flow guide baffles 464 mechanically couple the flow divider 460 to the exterior component 410 such that exhaust can flow within the flow divider 460 along the main flow chamber 402 and in the thermal management chamber 450 defined by the space between the flow divider 460 and the exterior component 410. The flow divider 460 includes an opening 466 through which dosed reductant is sprayed into the main flow chamber 402. The wider opening to the thermal management chamber 450 at the inlet 404 increases the mass flow of the exhaust gas and, in turn, increases flow velocities through the opening 466. In some implementations, the doser mount member 440 can include a partition that extends between the doser mount member 440 and the flow divider 460 downstream of the opening 466 such that flow through the thermal management chamber 450 is redirected through the opening 466 to provide an exhaust assist to dosed reductant sprayed into the opening 466. In the implementation shown, the doser mount member 440 includes an indentation to reduce a distance between a doser nozzle and the opening 466. The indentation on the doser mount member 440 can reduce the likelihood of recirculation and trapping of reductant droplets at the doser. These features can be aligned with respect to flow direction to help smoothen the flow and avoid recirculation.

In the implementation shown, the inlet 404 includes one or more slats 408 spanning across at least a portion of the inlet 404. The one or more slats 408 are shown as curved plates or airfoils to redirect incoming exhaust gas flow into the decomposition reactor 400. That is, the one or more slats 408 are configured to redirect incoming exhaust gas flow from a first direction at the inlet 404 to a second direction that is different than the first direction. In some implementations, the one or more slats 408 can be flat plates. In some instances the one or more slats 408 can include perforations. In still other instances, turbulators or vaning or other flow control features can be included on each of or one of the one or more slats 408. The one or more slats 408 may also reduce the likelihood of dosed reductant droplets travelling upstream out the inlet 404.

The main flow chamber 402 is separated into a first chamber 470 and a second chamber 480 (shown best in FIG. 29). A first curved partition 478 in the main flow chamber 402 separates a first treated reductant and exhaust gas flow in the first chamber 470 from an untreated exhaust gas flow in the second chamber 480. By providing an untreated and treated flow configuration, the design lowers the pressure drop from the inlet 404 to the outlet 406 of the decomposition reactor 400 while untreated exhaust gas flow through the second chamber 480 assists in maintaining an increased temperature for the interior walls to reduce deposit formation. The dual chamber 470, 480 design also channelizes the exhaust gas flow into one or more swirling diverters 488. A second curved partition 458 separates untreated flow in main flow chamber 402 from the untreated exhaust gas flow in the thermal management chamber 450. The curvature of the first and second partitions 478, 458 helps in smooth transition of the exhaust gas flow from the second chamber 480 and the thermal management chamber 450 into a downstream portion of the main flow chamber 402 to be combined at the outlet 406. The smoothed flow and recombination in the downstream portion of the first chamber assists in reduction of the overall pressure drop at the outlet 406.

The first chamber includes a mixer 490 within the first chamber 470 and positioned proximate the inlet 404 and downstream of the opening 466 for the dosed reductant. The mixer 490 is coupled to the interior of the flow divider 460 and mixes the incoming exhaust gas with dosed reductant within the decomposition reactor 400. In some implementations, the mixer 490 can be a cross-vaned mixer to assist in the breaking down of the reductant droplets, reducing recirculation/flow separation due to the flow redirection, and improving flow distribution within the decomposition reactor 400. Alternatively, the mixer 490 can be a louvered flange or swirl blades. The mixer 490 mixes the exhaust gas and dosed reductant within the first chamber 470 and increases mixing by reducing particle size and improving evaporation.

Exhaust gas flow from both the first chamber 470 and the second chamber 480 are recombined at the downstream portion of the main flow chamber 402 at an entry to the one or more swirling diverters 488. The one or more swirling diverters 488 are configured to impart a swirl or vortical motion to the combined reductant and exhaust gas flow to increase the distance travelled, which in turn provides more time for evaporation and mixing of the reductant and the exhaust gas from the treated flow of the first chamber 470 and the untreated flow from the second chamber 480. The position, size, and location of the one or more swirling diverters 488 help equally distribute the flow, minimize pressure drop, and allow smooth transition of the combined exhaust gas flow. In some implementations, the one or more swirling diverters 488 can instead be a straight or curved cone incorporating perforations, slots, or other features.

The thermal management chamber 450 is defined by the volume between the flow divider 460 and the exterior component 410. In the implementation shown, the thermal management chamber 450 includes one or more flow guide baffles 464 from the inlet 404 and along at least a portion of the volume defined by the outer wall 432 and the flow divider 460. In some instances, the one or more flow guide baffles 464 extend to a distance that is greater than 50% of the length of the outer wall 432. In some instances, the one or more flow guide baffles 464 extend to a distance that is less than 50% of the length of the outer wall 432.

In the implementation shown, the second partition 458 includes one or more openings 468, such as perforations, slots, louvers, etc., through which flow from the thermal management chamber 450 is recombined with downstream flow of the main flow chamber 402. As noted above, a downstream flange 462 can be couple to the outlet 406 and/or the exterior component 410 to fluidly seal the flow divider to the outlet 406 and/or exterior component 410 such that all of the exhaust gas flow from the thermal management chamber 450 is directed through the one or more openings 468. The one or more openings 468 can be perforated cones at the exit of thermal management chamber 450 to increase flow velocity and reducing reductant droplets from impacting the outlet end surface of the flow divider 460. The perforated cone design may help to avoid droplets entering the thermal management chamber 450. In other implementations, the one or more openings 468 can be slots, holes, or other shaped bypass passages.

In operation, incoming exhaust gas is split into a first flow path through the main flow chamber 402 and a second flow path through the thermal management chamber 450 shown in FIG. 29. A ratio of a first area of exposure 492 for flow from the inlet 404 into the main flow chamber 402 to a second area of exposure 494 for flow into the thermal management chamber 450 from the inlet 404 controls the mass flow of incoming exhaust gas into the main flow chamber 402 and the thermal management chamber 450. The ratio for the first area of exposure 492 and the second are of exposure 494 can vary based on the configuration of the system, the doser, etc. In some implementations, the ratio can be between 7%, inclusive, and 20%, inclusive for percentage ratio of the first area of exposure 492 to the second area of exposure 494.

Exhaust gas mass flow into the main flow chamber 402 and is split into the first chamber 470 and the second chamber 480 also shown in FIG. 29. The exhaust gas mass flow flowing into the first chamber 470 is mixed with reductant dosed through the opening 466 in the flow divider 460 and flows downstream to the mixer 490 positioned within the first chamber 470 to further mix. The exhaust gas mass flow into the second chamber 480 is not mixed as much with the dosed reductant and flows into the second chamber 480 for additional thermal management and pressure drop improvement. The exhaust gas mass flow of the thermal management chamber 450 is recombined with the exhaust gas mass flow from the main chamber via reintroduction of the exhaust gas mass flow of the thermal management chamber 450 through the one or more openings 468.

The bypass of untreated exhaust gas flow through the thermal management chamber 450 is used to control a temperature of the flow divider 460 at desired temperature, such as 160 degrees Celsius or greater. In some implementations, the desired temperature may be 200 degrees Celsius. In some implementations, the desired temperature may be greater than a surface exposed to an ambient temperature. For instance, the thermal management chamber 450 may maintain the flow divider 460 at a temperature of 200 degrees Celsius while an exterior wall, such as a system without the thermal management chamber, may only achieve a temperature of 115 degrees Celsius. By controlling the temperature of the flow divider 460 at the desired temperate, the dosed reductant droplets that come into contact with the flow divider 460 evaporate to reduce the formation of deposits, even if wall wetting occurs on an inner wall surface of the flow divider 460.

The one or more flow guide baffles 464 provided in the thermal management chamber 450 spread the untreated exhaust gas flow within the thermal management chamber 450 to provide passive thermal management control. For instance, the one or more flow guide baffles 464 can be evenly spaced to provide substantially uniform amounts of exhaust gas mass flow through different portions of the thermal management chamber 450 such that the flow divider 460 is maintained at a substantially uniform temperature. In other instances, the one or more flow guide baffles 464 can be asymmetrically spaced to provide varying amounts of exhaust gas mass flow through different portions of the thermal management chamber 450 such that the flow divider 460 is maintained at a desired temperature profile or gradient.

In other instances, the one or more flow guide baffles 464 can direct more or less exhaust gas mass flow to different regions of the flow divider 460 to provide increased or decreased temperatures at different portions of the flow divider 460. For instance, the one or more flow guide baffles 464 may be configured to concentrate untreated exhaust gas flow at a region of the flow divider 460 where deposit formation is likely. That is, a distance between two of the one or more flow guide baffles 464 can narrow or otherwise reduce a cross-sectional area for exhaust gas flowing through a portion of the thermal management chamber 450 to increase a velocity of exhaust gas flow over a corresponding portion of the flow divider 460. The increased velocity of exhaust gas over the portion of the flow divider 460 increases convective heat transfer, thereby increasing a temperature of that portion of the flow divider 460. Similarly, a distance between two of the one or more flow guide baffles 464 can increase or otherwise increase a cross-sectional area for exhaust gas flowing through a portion of the thermal management chamber 450 to decrease a velocity of exhaust gas flow over a corresponding portion of the flow divider 460. The decreased velocity of exhaust gas over the portion of the flow divider 460 decreases convective heat transfer, thereby decreasing a temperature of that portion of the flow divider 460. Thus, the configuration of the one or more flow guide baffles 464 within the thermal management chamber 450 can be configured to provide non-uniform temperatures for the flow divider 460.

In some implementations, a portion of the untreated exhaust gas along the second flow path in the thermal management chamber can be redirected by the partition that extends between the doser mount member 440 and the flow divider 460 downstream of the opening 466 such that flow through the thermal management chamber 450 is redirected through the opening 466 to provide an exhaust assist to dosed reductant sprayed into the opening 466. In other instances, the partition may be omitted and exhaust flow within the thermal management chamber 450 may still flow through the opening 466 to provide an exhaust assist to the dosed reductant.

FIG. 30 depicts reductant particle flow paths within the reductant decomposition reactor 400 and shows the redirection of reductant particles off of the one or more slats 408 at the inlet 404 to reduce upstream reductant spray. FIG. 31 depicts exhaust particle flow paths within the reductant decomposition reactor 400 from the inlet 404 to the outlet 406, including the flow paths from upstream and downstream components or exhaust piping. FIG. 32 depicts the velocities of particles within the reductant decomposition reactor 400 at the outlet 406, which shows a swirling vortex of velocities with a lower velocity in a center of the outlet 206. FIG. 33 depicts exhaust particle flow paths within the reductant decomposition reactor 400 at the outlet 406.

FIGS. 34A and 34B depict an implementation of the decomposition reactor 400 with blades 500 positioned about a portion of the inlet 404 to impart an initial swirling or vortical motion to the incoming exhaust gas flow.

FIGS. 35A and 35B depict an implementation of the decomposition reactor 400 with a louvered flange 510 and a perforated tube 516 positioned proximate the inlet 404. The louvered flange 510 can be configured such that a first portion 512 directs incoming exhaust gas flow into the thermal management chamber 450 and a second portion 514 directs incoming exhaust gas flow into the second chamber 480. The perforated tube 516 can include one or more blades 518 on an upstream face to induce a swirling or vortical motion to the incoming exhaust gas flow prior to exiting into the first chamber 470 of the main flow chamber 402 through the perforations of the perforated tube 516. FIG. 36 depicts an implementation of the decomposition reactor 400 having the louvered flange 510 and perforated tube 516 positioned proximate the inlet 404 of FIGS. 35A and 35B and a perforated cone 520 positioned at the outlet 406. In some implementations, a single partition 522 can separate the first chamber 470 from the second chamber 480. FIGS. 37A and 37B depict an implementation of the decomposition reactor 400 having the louvered flange 510 and perforated tube 516 positioned proximate the inlet 404 of FIGS. 35A and 35B and a slotted or louvered cone 530 positioned at the outlet 406.

FIGS. 38A and 38B depict an implementation of the decomposition reactor 400 that can include one or more sets of perforations 540 formed in the flow divider 460, either in lieu of or in addition to the one or more openings 468. The one or more sets of perforations 540 can be positioned proximate the outlet 406 to permit exhaust gas flow from the thermal management chamber 450 to flow into the main flow chamber 402 at one or more angles relative to the one or more swirling diverters 488.

FIGS. 39A and 39B depict an implementation of the decomposition reactor 400 showing the one or more openings 468 in greater detail for providing an exhaust assisted bypass from the thermal management chamber 450 back into the main flow chamber 402.

FIG. 40 depicts an implementation of the decomposition reactor 400 with a reductant doser mounted on an interior region of the decomposition reactor 400. FIGS. 41A and 41B depict an implementation of the decomposition reactor 400 with the reductant doser mounted on an exterior surface of the decomposition reactor 400. Thus, the doser mount 442 can be positioned at any point on the doser mount member 440 and/or anywhere else on the exterior component 410.

In some implementations, the decomposition reactor 400 can included smoothened inlet and outlet corners and/or curved back and side walls to provide additional smooth flow transition in a more compact decomposition reactor 400 width with a reduced center to center distance between the inlet 404 and outlet 406. The smoothened corners and/or walls can reduce flow recirculation and flow separation, which can improve flow distribution and uniformity within the decomposition reactor 400. The curved back and/or sidewalls can also increase structural strength and reduce acoustic vibrations of the decomposition reactor 400.

The decomposition reactors 200, 400 provided herein provide for controlled mass flow split of exhaust gas, thermal management using the thermal management chambers, exhaust assist to dosed reductant, slats at the inlet to help smoothly guide the exhaust gas into the main flow chamber to promote mixing, and angled placement of a doser using the doser mount and direct reductant spray into the exhaust gas flow stream to allow for decomposition with minimal deposit formation while delivering a high level of reductant uniformity at the outlet.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A decomposition reactor for an exhaust system comprising:
    an exterior component defining an internal volume and having an inlet and an outlet, wherein the inlet and outlet are formed on a same side of the exterior component; and
    a flow divider positioned within the internal volume defined by the exterior component and coupled to the exterior component, the flow divider defining a thermal management chamber and a main flow chamber within the internal volume, the main flow chamber in fluid communication with the inlet and the outlet, the thermal management chamber in fluid communication with the inlet and a downstream portion of the main flow chamber proximate the outlet, the flow divider comprising an opening through which reductant is dosed into the main flow chamber;
    wherein a first flow path of exhaust flows from the inlet into the main flow chamber to mix with reductant dosed through the opening in the flow divider and out the outlet; and
    wherein a second flow path of exhaust flows from the inlet into the thermal management chamber to control a temperature of a portion of the flow divider and out through one or more openings formed in the flow divider into the main flow chamber.

2. The decomposition reactor of claim 1 further comprising a mixer positioned within the main flow chamber.

3. The decomposition reactor of claim 1 further comprising one or more flow guide baffles positioned in the thermal management chamber between the flow divider and the exterior component.

4. The decomposition reactor of claim 3, wherein the one or more flow guide baffles extend at least 50% of a length of an outer wall of the exterior component.

5. The decomposition reactor of claim 3, wherein the one or more flow guide baffles are evenly spaced within the thermal management chamber to provide substantially uniform amounts of exhaust gas mass flow.

6. The decomposition reactor of claim 3, wherein the one or more flow guide baffles are configured to concentrate exhaust gas flow at a region of the flow divider.

7. The decomposition reactor of claim 6, wherein concentrating exhaust gas flow at the region of the flow divider comprises reducing a cross-sectional area for exhaust gas flowing through a portion of the thermal management chamber proximate the region.

8. The decomposition reactor of claim 3, wherein the one or more flow guide baffles comprise flat plates.

9. The decomposition reactor of claim 1, wherein the one or more openings comprise perforated cones.

10. The decomposition reactor of claim 1 further comprising one or more slats spanning across at least a portion of the inlet and configured to redirect exhaust gas flow from a first direction from the inlet to a second, different direction.

11. A decomposition reactor for an exhaust system comprising:
    a exterior component defining an internal volume and having an inlet and an outlet, wherein the inlet and outlet are formed on a same side of the exterior component;
    a flow divider positioned within the internal volume defined by the exterior component and coupled to the exterior component, the flow divider defining a thermal management chamber and a main flow chamber within the internal volume, the main flow chamber in fluid communication with the inlet and the outlet, the thermal management chamber in fluid communication with the inlet and a downstream portion of the main flow chamber proximate the outlet, the flow divider comprising an opening through which reductant is dosed into the main flow chamber; and
    one or more swirling diverters coupled to the flow divider and positioned proximate the outlet of the exterior component;
    wherein a first flow path of exhaust flows from the inlet into the main flow chamber to mix with reductant dosed through the opening in the flow divider and out the outlet; and
    wherein a second flow path of exhaust flows from the inlet into the thermal management chamber to control a temperature of a portion of the flow divider and out through one or more openings formed in the flow divider into the main flow chamber.

12. The decomposition reactor of claim 11 further comprising a mixer positioned within the main flow chamber.

13. The decomposition reactor of claim 11 further comprising one or more flow guide baffles positioned in the thermal management chamber between the flow divider and the exterior component.

14. The decomposition reactor of claim 13, wherein the one or more flow guide baffles extend at least 50% of a length of an outer wall of the exterior component.

15. The decomposition reactor of claim 13, wherein the one or more flow guide baffles are evenly spaced within the thermal management chamber to provide substantially uniform amounts of exhaust gas mass flow.

16. The decomposition reactor of claim 13, wherein the one or more flow guide baffles are configured to concentrate exhaust gas flow at a region of the flow divider.

17. The decomposition reactor of claim 16, wherein concentrating exhaust gas flow at the region of the flow divider comprises reducing a cross-sectional area for exhaust gas flowing through a portion of the thermal management chamber proximate the region.

18. The decomposition reactor of claim 11, wherein the main flow chamber comprises a partition dividing the main flow chamber into a first chamber and a second chamber, the first chamber receiving the first flow path of exhaust, the second chamber receiving a third flow path of exhaust.

19. The decomposition reactor of claim 18, wherein the first flow path of exhaust from the first chamber and the third flow path of exhaust from the second chamber combine in the downstream portion of the main flow chamber and upstream of the one or more swirling diverters.

20. A decomposition reactor for an exhaust system comprising:
  an exterior component defining an internal volume and having an inlet and an outlet, wherein the inlet and outlet are formed on a same side of the exterior component;
  a flow divider positioned within the internal volume defined by the exterior component and coupled to the exterior component, the flow divider defining a thermal management chamber and a main flow chamber within the internal volume, the main flow chamber in fluid communication with the inlet and the outlet, the thermal management chamber in fluid communication with the inlet and a downstream portion of the main flow chamber proximate the outlet, the flow divider comprising an opening through which reductant is dosed into the main flow chamber;
  a mixer positioned within the main flow chamber; and
  one or more flow guide baffles positioned in the thermal management chamber between the flow divider and the exterior component;
  wherein a first flow path of exhaust flows from the inlet into the main flow chamber to mix with reductant dosed through the opening in the flow divider and out the outlet; and
  wherein a second flow path of exhaust flows from the inlet into the thermal management chamber to control a temperature of a portion of the flow divider and out through one or more openings formed in the flow divider into the main flow chamber.

21. The decomposition reactor of claim 20, wherein the one or more flow guide baffles extend at least 50% of a length of an outer wall of the exterior component.

22. The decomposition reactor of claim 20, wherein the one or more flow guide baffles are evenly spaced within the thermal management chamber to provide substantially uniform amounts of exhaust gas mass flow.

23. The decomposition reactor of claim 20, wherein the one or more flow guide baffles are configured to concentrate exhaust gas flow at a region of the flow divider.

24. The decomposition reactor of claim 20 further comprising one or more swirling diverters coupled to the flow divider and positioned proximate the outlet of the exterior component.

25. The decomposition reactor of claim 24, wherein the one or more swirling diverters impart a vortical motion to a combined reductant and exhaust gas flow exiting out the outlet.

* * * * *